(12) United States Patent
Zhu

(10) Patent No.: US 12,444,090 B2
(45) Date of Patent: Oct. 14, 2025

(54) POINT CLOUD ATTRIBUTE PREDICTION METHOD AND APPARATUS, AND RELATED DEVICE

(71) Applicant: TENCENT TECHNOLOGY (SHENZHEN) COMPANY LIMITED, Shenzhen (CN)

(72) Inventor: Wenjie Zhu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 298 days.

(21) Appl. No.: 17/989,523

(22) Filed: Nov. 17, 2022

(65) Prior Publication Data

US 2023/0082456 A1 Mar. 16, 2023

Related U.S. Application Data

(63) Continuation of application No. PCT/CN2022/080809, filed on Mar. 15, 2022.

(30) Foreign Application Priority Data

Jun. 11, 2021 (CN) .......................... 202110655607.3

(51) Int. Cl.
*G06T 9/00* (2006.01)
*H04N 19/105* (2014.01)
*H04N 19/169* (2014.01)

(52) U.S. Cl.
CPC .......... *G06T 9/001* (2013.01); *H04N 19/105* (2014.11); *H04N 19/169* (2014.11)

(58) Field of Classification Search
None
See application file for complete search history.

(56) References Cited

U.S. PATENT DOCUMENTS 10,223,810 B2   3/2019   Chou et al.
10,659,816 B2   5/2020   Mammou et al.
(Continued)

FOREIGN PATENT DOCUMENTS

CN   110996098 A   4/2020
CN   111095929 A   5/2020
(Continued)

OTHER PUBLICATIONS

The World Intellectual Property Organization (WIPO) International Search Report for PCT/CN2022/080809 Jun. 7, 2022 7 Pages (including translation).
(Continued)

*Primary Examiner* — Leon Viet Q Nguyen
(74) *Attorney, Agent, or Firm* — ANOVA LAW GROUP PLLC

(57) ABSTRACT

A method includes: decoding a point cloud code stream to obtain decoded points in a point cloud; determining a target association relationship, the target association relationship including at least one association relationship of a preset association relationship between neighbor point parameters and a preset association relationship between a space parameter of the point cloud and the neighbor point parameters; obtaining the neighbor point parameters according to the target association relationship; selecting at least one neighbor point of a current point from the decoded points according to at least one of a quantity N of candidate points, a quantity K of neighbor points, and a preset distance d between the neighbor point and the current point in the neighbor point parameters; and determining a predicted value of attribute information of the current point according to attribute information of the at least one neighbor point of the current point.

20 Claims, 12 Drawing Sheets

(56) References Cited

U.S. PATENT DOCUMENTS

| | | | |
|---|---|---|---|
| 10,692,249 | B2 | 6/2020 | Vosoughi et al. |
| 10,694,210 | B2 | 6/2020 | Chou et al. |
| 10,762,667 | B2 | 9/2020 | Mekuria |
| 10,805,646 | B2 | 10/2020 | Tourapis et al. |
| 2019/0080483 | A1 | 3/2019 | Mammou et al. |
| 2020/0053391 | A1* | 2/2020 | Mammou ............ H04N 19/597 |
| 2020/0105025 | A1* | 4/2020 | Yea ......................... G06T 15/08 |
| 2020/0111236 | A1 | 4/2020 | Tourapis et al. |
| 2020/0175725 | A1 | 6/2020 | Mekuria |
| 2020/0217937 | A1 | 7/2020 | Mammou et al. |
| 2021/0105504 | A1* | 4/2021 | Hur ....................... H04N 19/167 |
| 2021/0314616 | A1* | 10/2021 | Ray ........................... G06T 9/00 |
| 2022/0254057 | A1 | 8/2022 | Li et al. |

FOREIGN PATENT DOCUMENTS

| | | |
|---|---|---|
| CN | 111145090 A | 5/2020 |
| CN | 111242997 A | 6/2020 |
| CN | 111405281 A | 7/2020 |
| CN | 112218079 A | 1/2021 |

OTHER PUBLICATIONS

"G-PCC Codec description v6", Jun. 2020, , ISO/IEC JTC1/SC29/WG11.

Stefan Gumhold et al., "Predictive point-cloud compression", 2005, ACM SIGGRAPH Sketches (SIGGRAPH'05). ACM.

Sebastian Schwarz et al., "Emerging MPEG Standards for Point Cloud Compression", 2018, vol. 9 No. 1, IEEE Journal on Emergingand Selected Topics in Circuits and Systems.

R.Mekuria et al., "Design, implementation, and evaluation of a point cloud codec for tele-immersive video", 2017, vol. 27 No. 4, IEEE Trans. Circuits and Systems for Video Technology.

Chao Cao et al., "3D Point Cloud Compression: A Survey", 2019, pp. 1-9. Int. Conf. 3D Web Technology (Web3D'19). ACM.

Robert A. Cohen et al., "Point Cloud Attribute Compression using 3-D Intra Prediction and Shape-Adaptive Transforms", 2016, pp. 141-150, Data Compression Conference (DCC'16).

Rajesh Matai et al., "Traveling Salesman Problem: An Overview of Applications, Formulations, and Solution Approaches", 2010, Traveling salesman problem, theory and applications.

Xiang Zhang et al., "Implicit Geometry Partition for Point Cloud Compression", 2020, pp. 73-82, 2020 Data Compression Conference (DCC), Snowbird, UT, USA.

Honglian Wei et al., "Enhanced Intra Prediction Scheme in Point Cloud Attribute Compression" ,2019, VCIP.

Xiang Zhang et al., "Linear Model based Geometry Coding for Lidar Acquired Point Clouds", 2020, pp. 406-406. 2020 Data Compression Conference (DCC), Snowbird, UT, USA.

Min Zhang et al., "PointHop: An Explainable Machine Learning Method for Point Cloud Classification", 2000, IEEE TMM.

Li Li et al., "Occupancy-Map-Based Rate Distortion Optimization for Video-Based Point Cloud Compression", 2019, ICIP.

Li Li et al., "Occupancy-map-based Rate Distortion Optimization and Partition for Video-based Point Cloud Compression ", 2020, IEEE TCSVT.

Li Li et al., "A-domain Perceptual Rate Control for 360-degree Video Compression", 2020, IEEE Journal on Selected Topics in Signal Processing.

Li Li et al., "Efficient Projected Frame Padding for Video-based Point Cloud Compression", 2019, IEEE TMM.

Li Li et al., "Rate Control for Video-based Point Cloud Compression", 2020, IEEE TIP.

Min Zhang et al., "Unsupervised Feedforward Feature (UFF) Learning for Point Cloud Classification and Segmentation", Dec. 1-4, 2020, 2020 IEEE International Conference on Visual Communications and Image Processing (VCIP), Macau.

Pranav Kadam et al., "Unsupervised Point Cloud Registration Via Salient Points Analysis (SPA)", Dec. 1-4, 2020, 2020 IEEE International Conference on Visual Communications and Image Processing (VCIP), Macau.

"AVS point cloud coding reference software algorithm description", Sep. 30, 2020.

Wenjie Zhu et al., "Lossless Point Cloud Geometry Compression via Binary Tree Partition and Intra Prediction", 2017, Workshop on Multimedia Signal Processing (MMSP'17).

Li Ll, et al., "Video-based compression for plenoptic point clouds", arXiv:1911.01355, Nov. 4, 2019.

* cited by examiner

POINT CLOUD ATTRIBUTE PREDICTION METHOD AND APPARATUS, AND RELATED DEVICE

RELATED APPLICATION(S)

This application is a continuation application of PCT Patent Application No. PCT/CN2022/080809 filed on Mar. 15, 2022, which claims priority to Chinese Patent Application No. 2021106556073, entitled "POINT CLOUD ATTRIBUTE PREDICTION METHOD AND APPARATUS, AND RELATED DEVICE" filed with the National Intellectual Property Administration, PRC on Jun. 11, 2021, all of which are incorporated herein by reference in entirety.

FIELD OF THE TECHNOLOGY

The present disclosure relates to the field of video encoding and decoding technologies, and in particular, to a point cloud attribute prediction technology.

BACKGROUND

Acquisition is performed on the surface of an object by using an acquisition device, to form point cloud data, and the point cloud data includes hundreds of thousands of or even more points. The point cloud data is usually transmitted between a video production device and a video playback device in the form of a point cloud media file. However, such a huge amount of point cloud data brings challenges to the transmission, so that the video production device often compress the point cloud data before transmission.

Compression of the point cloud data includes compression of position information and compression of attribute information. For the compressed attribute information, a decoder side usually restore the compressed attribute information in the point cloud data through prediction, for example, obtain one or more adjacent points of a current point from encoded points, and predict attribute information of the current point according to attribute information of the adjacent points.

A sample process of point cloud attribute prediction includes: acquiring preset neighbor point parameters such as the quantity of candidate points and the quantity of neighbor points, and determining a predicted value of point cloud attribute information according to the preset neighbor point parameters. However, this manner of predicting a point cloud attribute based on preset neighbor point parameters is relatively undiversified, and the prediction efficiency is relatively low, which affects the decoding efficiency accordingly.

SUMMARY

The present disclosure provides a point cloud attribute prediction method and apparatus, and a related device, which determines neighbor point parameters by using a new method, thereby enriching the prediction methods for determining a point cloud attribute.

In one aspect, the present disclosure provides a point cloud attribute prediction method, performed by a computing device, the method including: decoding a point cloud code stream to obtain decoded points in a point cloud; determining a target association relationship, the target association relationship including at least one association relationship of a preset association relationship between neighbor point parameters and a preset association relationship between a space parameter of the point cloud and the neighbor point parameters; obtaining the neighbor point parameters according to the target association relationship, the neighbor point parameters including at least one of a quantity N of candidate points of a current point, a quantity K of neighbor points, and a preset distance d between the neighbor point and the current point, both N and K being positive integers, and d being a positive number; selecting at least one neighbor point of the current point from the decoded points according to the neighbor point parameters; and determining a predicted value of attribute information of the current point according to attribute information of the at least one neighbor point of the current point.

In the present disclosure, neighbor point parameters are determined based on a target association relationship, which, compared with the manner of directly presetting the neighbor point parameters, enriches the manners of determining a predicted value of a point cloud attribute.

In another aspect, the present disclosure provides a point cloud attribute prediction method, performed by a computing device, the method including: acquiring encoded points in a point cloud; determining a target association relationship, the target association relationship including at least one association relationship of a preset association relationship between neighbor point parameters and a preset association relationship between a space parameter of the point cloud and the neighbor point parameters; obtaining the neighbor point parameters according to the target association relationship, the neighbor point parameters including at least one of a quantity N of candidate points of a current point, a quantity K of neighbor points, and a preset distance d between the neighbor point and the current point, both N and K being positive integers, and d being a positive number; selecting at least one neighbor point of the current point from the encoded points according to the neighbor point parameters; and determining a predicted value of attribute information of the current point according to attribute information of the at least one neighbor point of the current point.

In yet another aspect, a point cloud attribute prediction apparatus is provided, including: a memory storing computer program instructions; and a processor coupled to the memory and configured to execute the computer program instructions and perform: decoding a point cloud code stream to obtain decoded points in a point cloud; determining a target association relationship, the target association relationship including at least one association relationship of a preset association relationship between neighbor point parameters and a preset association relationship between a space parameter of the point cloud and the neighbor point parameters; obtaining the neighbor point parameters according to the target association relationship, the neighbor point parameters including at least one of a quantity N of candidate points of a current point, a quantity K of neighbor points, and a preset distance d between the neighbor point and the current point, both N and K being positive integers, and d being a positive number; selecting at least one neighbor point of the current point from the decoded points according to the neighbor point parameters; and determining a predicted value of attribute information of the current point according to attribute information of the at least one neighbor point of the current point.

In yet another aspect, a point cloud attribute prediction apparatus is provided, including: a memory storing computer program instructions; and a processor coupled to the memory and configured to execute the computer program instructions and perform: acquiring encoded points in a point cloud; determining a target association relationship, the target association relationship including at least one association relationship of a preset association relationship between neighbor point parameters and a preset association relationship between a space parameter of the point cloud and the neighbor point parameters; obtaining the neighbor point parameters according to the target association relationship, the neighbor point parameters including at least one of a quantity N of candidate points of a current point, a quantity K of neighbor points, and a preset distance d between the neighbor point and the current point, both N and K being positive integers, and d being a positive number; selecting at least one neighbor point of the current point from the encoded points according to the neighbor point parameters; and determining a predicted value of attribute information of the current point according to attribute information of the at least one neighbor point of the current point.

In yet another aspect, an encoder is provided, including a processor and a memory. The memory is configured to store a computer program, and the processor is configured to invoke and run the computer program stored in the memory to perform the method including: decoding a point cloud code stream to obtain decoded points in a point cloud; determining a target association relationship, the target association relationship including at least one association relationship of a preset association relationship between neighbor point parameters and a preset association relationship between a space parameter of the point cloud and the neighbor point parameters; obtaining the neighbor point parameters according to the target association relationship, the neighbor point parameters including at least one of a quantity N of candidate points of a current point, a quantity K of neighbor points, and a preset distance d between the neighbor point and the current point, both N and K being positive integers, and d being a positive number; selecting at least one neighbor point of the current point from the decoded points according to the neighbor point parameters; and determining a predicted value of attribute information of the current point according to attribute information of the at least one neighbor point of the current point.

In yet another aspect, a decoder is provided, including a processor and a memory. The memory is configured to store a computer program, and the processor is configured to invoke and run the computer program stored in the memory to perform the method including: acquiring encoded points in a point cloud; determining a target association relationship, the target association relationship including at least one association relationship of a preset association relationship between neighbor point parameters and a preset association relationship between a space parameter of the point cloud and the neighbor point parameters; obtaining the neighbor point parameters according to the target association relationship, the neighbor point parameters including at least one of a quantity N of candidate points of a current point, a quantity K of neighbor points, and a preset distance d between the neighbor point and the current point, both N and K being positive integers, and d being a positive number; selecting at least one neighbor point of the current point from the encoded points according to the neighbor point parameters; and determining a predicted value of attribute information of the current point according to attribute information of the at least one neighbor point of the current point.

In the present disclosure, a point cloud code stream is decoded to obtain decoded points in a point cloud; a target association relationship is determined, the target association relationship including at least one association relationship of a preset association relationship between neighbor point parameters and a preset association relationship between a space parameter of the point cloud and the neighbor point parameters; the neighbor point parameters used when or in response to a determination that neighbor points of a current point are determined are obtained according to the target association relationship, the neighbor point parameters including at least one of a quantity N of candidate points of the current point, a quantity K of neighbor points, and a preset distance d between the neighbor point and the current point; at least one neighbor point of the current point is selected from the decoded points according to the neighbor point parameters; and a predicted value of attribute information of the current point is determined according to attribute information of the at least one neighbor point of the current point. That is, in the present disclosure, neighbor point parameters are determined based on a target association relationship, which, compared with the manner of directly presetting the neighbor point parameters, enriches the manners of determining a predicted value of a point cloud attribute. In addition, compared with the existing setting of the neighbor point parameters based on experience, determining the neighbor point parameters according to the target association relationship in the embodiments of the present disclosure can improve the accuracy of the determined neighbor point parameters, and a predicted value of attribute information of a current point can be determined based on the neighbor point parameters, thereby improving the decoding efficiency.

Other aspects of the present disclosure can be understood by those skilled in the art in light of the description, the claims, and the drawings of the present disclosure.

BRIEF DESCRIPTION OF THE DRAWINGS

To facilitate a better understanding of technical solutions of certain embodiments of the present disclosure, accompanying drawings are described below. The accompanying drawings are illustrative of certain embodiments of the present disclosure, and a person of ordinary skill in the art may still derive other drawings from these accompanying drawings without having to exert creative efforts. When the following descriptions are made with reference to the accompanying drawings, unless otherwise indicated, same numbers in different accompanying drawings may represent same or similar elements. In addition, the accompanying drawings are not necessarily drawn to scale.

DETAILED DESCRIPTION

Figure 1:
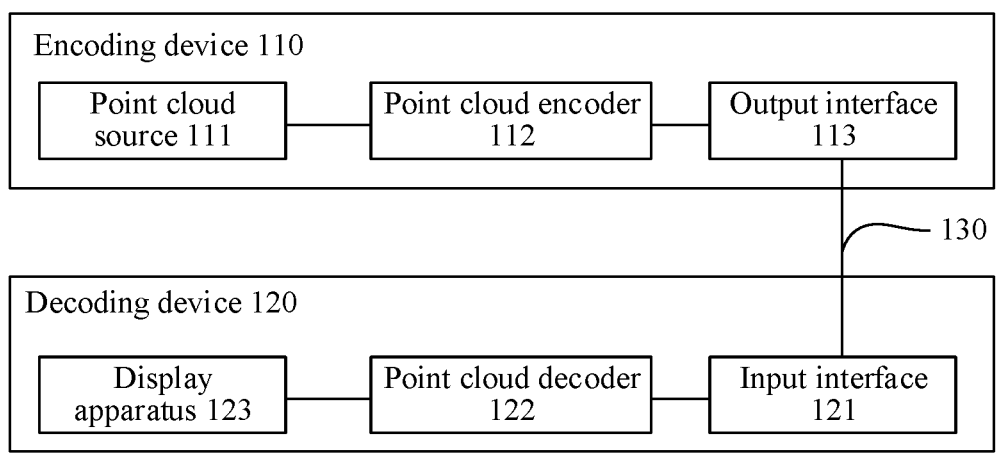
FIG. 1 is a schematic block diagram of a point cloud encoding and decoding system according to certain embodiment(s) of the present disclosure.

Technical solutions in the embodiments of the present disclosure are described below with reference to the accompanying drawings in the embodiments of the present disclosure.

To make objectives, technical solutions, and/or advantages of the present disclosure more comprehensible, certain embodiments of the present disclosure are further elaborated in detail with reference to the accompanying drawings. The embodiments as described are not to be construed as a limitation to the present disclosure. All other embodiments obtained by a person of ordinary skill in the art without creative efforts shall fall within the protection scope of embodiments of the present disclosure.

When and as applicable, the term "an embodiment," "one embodiment," "some embodiment(s), "some embodiments," "certain embodiment(s)," or "certain embodiments" may refer to one or more subsets of all possible embodiments. When and as applicable, the term "an embodiment," "one embodiment," "some embodiment(s), "some embodiments," "certain embodiment(s)," or "certain embodiments" may refer to the same subset or different subsets of all the possible embodiments, and can be combined with each other without conflict.

In certain embodiments, the term "based on" is employed herein interchangeably with the term "according to."

A point cloud is a set of discrete points that are distributed in space and used for expressing the spatial structure and surface attributes of a three-dimensional (3D) object or 3D scene.

Point cloud data is a record form of a point cloud, and points in the point cloud may be described by position information and attribute information of the points. For example, the position information of the points may be 3D coordinate information of the points. The position information of the points may also be referred to as geometry information of the points. For example, the attribute information of the points may include color information and/or a reflectivity, and the like. For example, the color information may be information in any color space. For example, the color information may be red green blue (RGB) information. For example, the color information may be YcbCr (YUV) information; Y represents luma, Cb (U) represents a blue color difference, Cr (V) represents red, and U and V represent chroma, used for describing color difference information. For a point cloud data obtained according to a laser measurement principle, points in the point cloud may be described by 3D coordinate information of points and a laser reflectance of the points. For a point cloud obtained according to a photogrammetry principle, points in the point cloud may be described by 3D coordinate information of the points and color information of the points. For a point cloud obtained with reference to the laser measurement principle and the photogrammetry principle, points in the point cloud may be described by 3D coordinate information of the points, a laser reflectance of the points, and color information of the points.

The method for acquiring point cloud data may include, but not limited to, at least one of the following: (1) Generation by a computing device. The computing device may generate point cloud data according to a virtual 3D object and a virtual 3D scene. (2) Acquisition through 3D laser scanning. Point cloud data of 3D objects or 3D scenes in the static real world can be obtained through 3D laser scanning, and millions of pieces of point cloud data can be obtained per second. (3) Acquisition through 3D photogrammetry. Visual scenes of the real world are acquired by using a 3D photography device (that is, a set of cameras or a camera device with a plurality of lenses and sensors) to obtain point cloud data of the visual scenes of the real world, and point cloud data of 3D objects or 3D scenes in the dynamic real world can be obtained through 3D photography. (4) Point cloud data of biological tissues and organs are acquired by using medical devices. In the medical field, point cloud data of biological tissues and organs can be acquired by using medical devices such as magnetic resonance imaging (MRI), computed tomography (CT), and electromagnetic positioning information.

According to the acquisition methods, point clouds may be divided into: dense point clouds and sparse point clouds.

According to time sequence types, the point clouds may be divided into: first-type static point clouds: that is, objects are stationary, and devices for acquiring the point clouds are also stationary; second-type dynamic point clouds: objects are moving, but the devices for acquiring the point clouds are stationary; third-type dynamically acquired point cloud: the devices for acquiring the point clouds are moving.

According to the use, the point clouds may be divided into two categories:

Category 1: machine perception point clouds. The machine perception point clouds may be applied to autonomous navigation systems, real-time inspection systems, geographic information systems, visual sorting robots, emergency rescue robots, and other scenarios.

Category 2: human eye perception point clouds. The human eye perception point clouds may be applied to digital cultural heritage, free viewpoint broadcasting, 3D immersive communication, 3D immersive interaction, and other point cloud implementation scenarios.

FIG. 1 is a schematic block diagram of a point cloud encoding and decoding system according to an embodiment of the present disclosure. FIG. 1 is merely an example, and the point cloud encoding and decoding system involved in this embodiment of the present disclosure includes, but not limited to, that shown in FIG. 1. As shown in FIG. 1, the point cloud encoding and decoding system includes an encoding device 110 and a decoding device 120. The encoding device 110 is configured to encode point cloud data (which can be understood as compression) to generate a code stream, and transmit the code stream to the decoding device 120. The decoding device 120 is configured to decode the code stream generated through encoding by the encoding device 110 to obtain decoded point cloud data.

The encoding device 110 in this embodiment of the present disclosure may be understood as a device having a point cloud encoding function, and the decoding device 120 may be understood as a device having a point cloud decoding function. That is, the encoding device 110 and the decoding device 120 in this embodiment of the present disclosure may include a wider range of apparatuses, for example, including, but not limited to, a smart phone, a desktop computer, a mobile computing device, a notebook (for example, laptop) computer, a tablet computer, a set-top box, a television, a camera, a display apparatus, a digital media player, a point cloud game console, or an in-vehicle computer.

In some embodiments, the encoding device 110 may transmit the encoded point cloud data (for example, a code stream) to the decoding device 120 through a channel 130. The channel 130 may include one or more media and/or apparatuses capable of transmitting the encoded point cloud data from the encoding device 110 to the decoding device 120.

In one example, the channel 130 includes one or more communication media configured to directly transmit the point cloud data encoded by the encoding device 110 to the decoding device 120 in real time. In this example, the encoding device 110 may modulate the encoded point cloud data according to the communication standard and transmit the modulated point cloud data to the decoding device 120. The communication media includes wireless communication media, for example a radio frequency spectrum. The communication media may also include wired communication media, for example, one or more physical transmission lines.

In another example, the channel 130 includes a storage medium. The storage medium can store point cloud data encoded by the encoding device 110. Storage media include a variety of locally accessible data storage media such as an optical disc, a DVD, and a flash memory. In this example, the decoding device 120 may read the encoded point cloud data from the storage medium.

In another example, the channel 130 includes a storage server. The storage server may store point cloud data encoded by the encoding device 110. In this instance, the decoding device 120 may download the encoded point cloud data stored in the storage server from the storage server. The storage server may also store the encoded point cloud data and may transmit the encoded point cloud data to the decoding device 120. The storage server may be, for example, a web server (for example, used for a website), or a file transfer protocol (FTP) server.

In some embodiments, the encoding device 110 includes a point cloud encoder 112 and an output interface 113. The output interface 113 may include a modulator/demodulator (modem) and/or a transmitter.

In some embodiments, in addition to the point cloud encoder 112 and the output interface 113, the encoding device 110 may further include a point cloud source 111.

The point cloud source 111 may include at least one of a point cloud acquisition apparatus (for example, a scanner), a point cloud archive apparatus, a point cloud input interface, and a computer graphics system. The point cloud input interface is configured to receive point cloud data from a point cloud content provider, and the computer graphics system is configured to generate point cloud data.

The point cloud encoder 112 encodes the point cloud data from the point cloud source 111 to generate a code stream. The point cloud encoder 112 transmits the encoded point cloud data to the decoding device 120 through the output interface 113. The encoded point cloud data may also be stored on a storage medium or a storage server for subsequent reading by the decoding device 120.

In some embodiments, the decoding device 120 includes an input interface 121 and a point cloud decoder 122.

In some embodiments, in addition to the input interface 121 and the point cloud decoder 122, the decoding device 120 may further include a display apparatus 123.

The input interface 121 includes a receiver and/or a modem. The input interface 121 can receive the encoded point cloud data through the channel 130.

The point cloud decoder 122 is configured to: decode the encoded point cloud data to obtain decoded point cloud data, and transmit the decoded point cloud data to the display apparatus 123.

The display apparatus 123 displays the decoded point cloud data. The display apparatus 123 may be integrated with the decoding device 120 or be independent of the decoding device 120. The display apparatus 123 may include a plurality of types of display apparatuses such as a liquid crystal display (LCD), a plasma display, an organic light-emitting diode (OLED) display, or a display apparatus of another type.

In addition, FIG. 1 is merely an example, and the technical solutions of the embodiments of the present disclosure are not limited to be applied to the point cloud encoding and decoding system shown in FIG. 1. For example, the technology of the present disclosure may alternatively be applied to single-side point cloud encoding or single-side point cloud decoding.

Because the point cloud is a set of massive points, storing the point cloud not only consumes a lot of memory, but also is not conducive to transmission, and there is no such a large bandwidth to support the point cloud to be transmitted directly at a network layer without compression. Therefore, it is necessary to compress the point cloud.

Currently, point clouds can be compressed through a point cloud encoding framework.

The point cloud encoding framework may be the geometry point cloud compression (G-PCC) encoding and decoding framework or the video point cloud compression (V-PCC) encoding and decoding framework provided by the moving picture experts group (MPEG), or may be the AVS-PCC encoding and decoding framework provided by the audio video standard (AVS) organization. Both G-PCC and AVS-PCC are aimed at static sparse point clouds, and encoding frameworks are roughly the same. The G-PCC encoding and decoding framework may be used for compressing the first-type static point clouds and the third-type dynamically acquired point clouds, and the V-PCC encoding and decoding framework may be used for compressing the second-type dynamic point clouds. The G-PCC encoding and decoding framework is also referred to as a point cloud codec TMC13, and the V-PCC encoding and decoding framework is also referred to as a point cloud codec TMC2.

The encoding and decoding framework applicable to this embodiment of the present disclosure is described below by using the G-PCC encoding and decoding framework.

Figure 2:
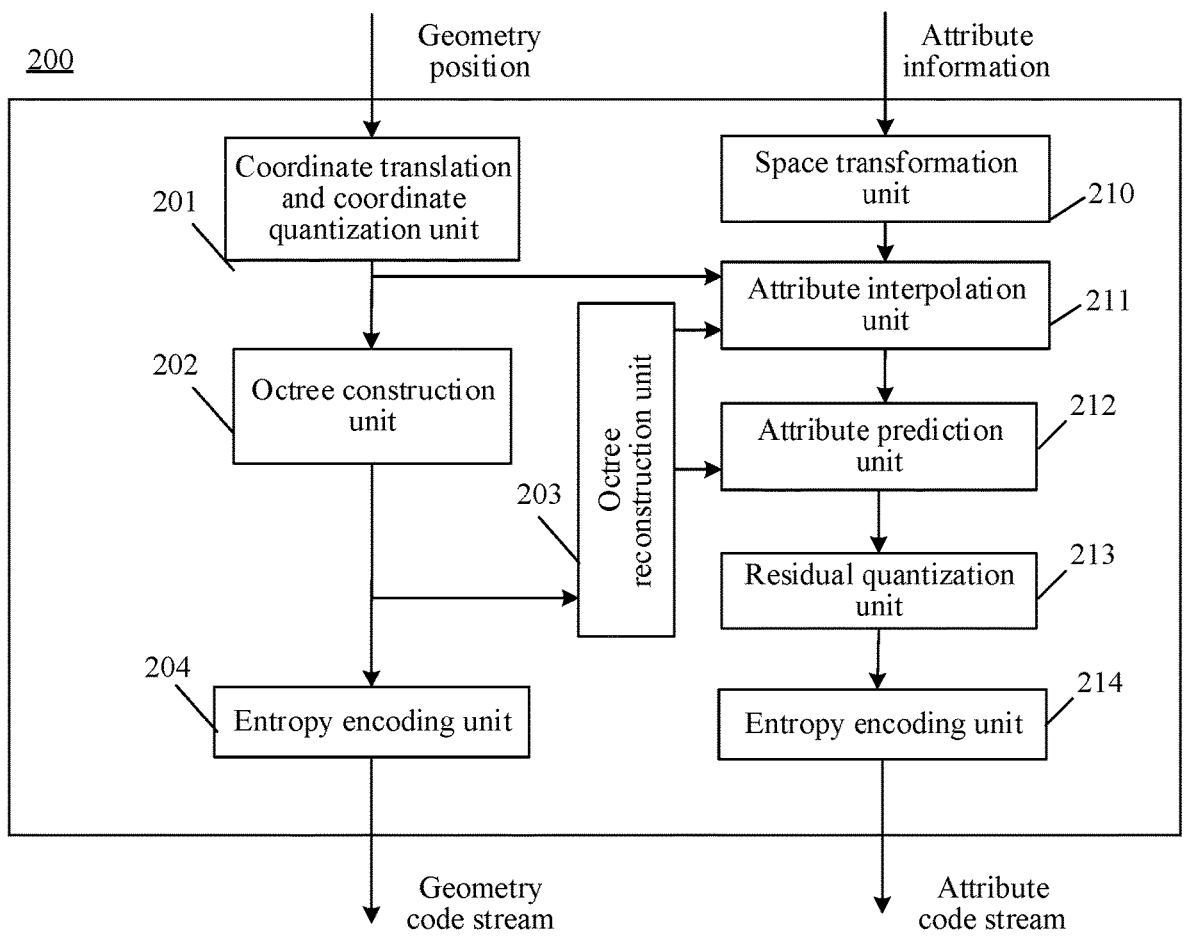
FIG. 2 is a schematic block diagram of an encoding framework according to certain embodiment(s) of the present disclosure.

FIG. 2 is a schematic block diagram of an encoding framework according to an embodiment of the present disclosure.

As shown in FIG. 2, the encoding framework 200 may acquire position information (which is also referred to as geometry information or geometry position) and attribute information of point cloud from the acquisition device. Encoding of the point cloud includes position encoding and attribute encoding.

The process of position encoding includes: performing preprocessing such as coordinate transformation and quantization and removal of repetition points on the original point cloud; and performing encoding after constructing an octree, to form a geometry code stream.

The process of attribute encoding includes: by giving real values of the reconstructed information of the position information and the attribute information of the inputted point cloud, one of the three prediction modes is selected for point cloud prediction, the predicted results are quantified, and arithmetic coding is performed to form an attribute code stream.

As shown in FIG. 2, position encoding may be implemented by the following units: a coordinate translation and coordinate quantization unit 201, an octree construction unit 202, an octree reconstruction unit 203, and an entropy encoding unit 204.

The coordinate translation and coordinate quantization unit 201 may be configured to: transform world coordinates of the points in the point cloud into relative coordinates, and quantize the coordinates, to reduce the quantity of coordinates. After quantization, points that are originally different may be assigned the same coordinates.

The octree construction unit 202 may encode position information of the quantized points in an octree encoding manner. For example, the point cloud is divided in the form of an octree, so that positions of the points may be in a one-to-one correspondence with the positions of the octree. By collecting statistics on the positions in the octree in which points exist, and recording flags thereof as 1, geometry encoding is performed.

The octree reconstruction unit 203 is configured to reconstruct the geometry positions of the points in the point cloud to obtain reconstructed geometry positions of the points.

The entropy encoding unit 204 may perform arithmetic coding on the position information outputted by the octree construction unit 202 in an entropy encoding manner, that is, generate a geometry code stream in an arithmetic coding manner by using the position information outputted by the octree construction unit 202. The geometry code stream may also be referred to as geometry bitstream.

Attribute encoding may be implemented by the following units: a space transformation unit 210, an attribute interpolation unit 211, an attribute prediction unit 212, a residual quantization unit 213, and an entropy encoding unit 214.

The space transformation unit 210 may be configured to transform an RGB color space of the points in the point cloud into the YCbCr format or other formats.

The attribute interpolation unit 211 may be configured to transform the attribute information of the points in the point cloud to minimize attribute distortion. For example, the attribute interpolation unit 211 may be configured to obtain a real value of the attribute information of the point. For example, the attribute information may be color information of the points.

The attribute prediction unit 212 may be configured to predict the attribute information of the point in the point cloud to obtain the predicted value of the attribute information of the point, and obtain a residual value of the attribute information of the point based on the predicted value of the attribute information of the point. For example, the residual value of the attribute information of the point may be a difference value between the real value of the attribute information of the point and the predicted value of the attribute information of the point.

The residual quantization unit 213 may be configured to quantize residual values of attribute information of points.

The entropy encoding unit 214 may perform entropy encoding on the residual values of the attribute information of the points through zero run length coding, to obtain an attribute code stream. The attribute code stream may be bitstream information.

With reference to FIG. 2, the main operations and processing for geometry structure encoding in the present disclosure are as follows:

(1) Pre-processing: including transforming coordinates and voxelization. The point cloud data in the 3D space is transformed into an integer form through zooming and translation operations, and the minimum geometry position thereof is moved to the coordinate origin.

(2) Geometry encoding: Geometry encoding includes two modes, which can be used under different conditions.

(a) Octree-based geometry encoding: The octree is a tree-shaped data structure. In 3D space division, a preset bounding box is evenly divided, and each node has eight child nodes. By using '1' and '0' to indicate whether each child node of the octree is occupied or not, occupancy code information is obtained as a code stream of geometry information of the point cloud.

(b) Trisoup-based geometry encoding: The point cloud is divided into blocks of a certain size, intersections at the edges of the blocks on the surface of the point cloud are located, and a triangle is constructed. Compression of geometry information is implemented by encoding intersection positions.

(3) Geometry quantization: The fineness of quantization is usually determined by a quantization parameter (QP). A larger value of QP indicated that coefficients with a larger value range will be quantized into the same output, and greater distortion and a lower code rate are usually caused. On the contrary, a smaller value of QP indicates that coefficients with a smaller value range will be quantized into the same output, and less distortion is caused, which corresponds to a relatively high bit rate. In point cloud encoding, quantization is performed directly on the coordinate information of points.

(4) Geometry entropy encoding: Statistical compression encoding is performed for the occupancy code information of the octree, and finally a binarized (0 or 1) compressed code stream is outputted. Statistical compression encoding is a lossless encoding manner that can effectively reduce the bit rate desired to express the same signal. A commonly used statistical compression encoding manner is content adaptive binary arithmetic coding (CABAC).

For attribute information encoding, the main operations and processing are as follows:

(1) Attribute recoloring: In the implementation of lossy encoding, after the geometry information is encoded, the encoder side may decode and reconstruct the geometry information, that is, restore the coordinate information of each point in the 3D point cloud. The attribute information corresponding to one or more adjacent points in the original point cloud is found as the attribute information of the reconstructed point.

(2) Attribute prediction encoding: During attribute prediction encoding, one or more points are selected as predicted values based on the adjacent relationship for the geometry information or attribute information, a weighted average is calculated to obtain a final attribute predicted value, and a difference between the real value and the predicted value is encoded.

(3) Attribute transform encoding: There are three modes in attribute transform encoding, which can be used under different conditions.

(a) Predicting transform encoding: A sub-point set is selected according to distances, and the point cloud is divided into a plurality of different levels of detail (LoDs), to realize point cloud representations from rough to fine. Bottom-top prediction can be implemented between adjacent layers. That is, the attribute information of the points introduced in the fine layer is predicted from the adjacent points in the rough layer, and a corresponding residual signal is obtained. Points at the lowest layer are used as reference information for encoding.

(b) Lifting Transform encoding: Based on LoD adjacent layer prediction, the weight update policy of neighborhood points is introduced, and finally the predicted attribute value of each point is obtained, and a corresponding residual signal is obtained.

(c) Region adaptive hierarchical transform (RAHT) encoding: After RAHT is performed on the attribute information, the signal is transformed into a transform domain, which is referred to as a transform coefficient.

(4) Attribute information quantization: The fineness of quantization is usually determined by the QP. In predicting transform encoding and lifting transform encoding, entropy encoding is performed after quantizing residual values; and in RAHT, entropy encoding is performed after quantizing transform coefficients.

(5) Attribute entropy coding: Final compression of the quantized attribute residual signal or transform coefficient is generally implemented through run length coding and arithmetic coding. Corresponding encoding modes, the QP, and other information are also encoded by using an entropy encoder.

Figure 3:
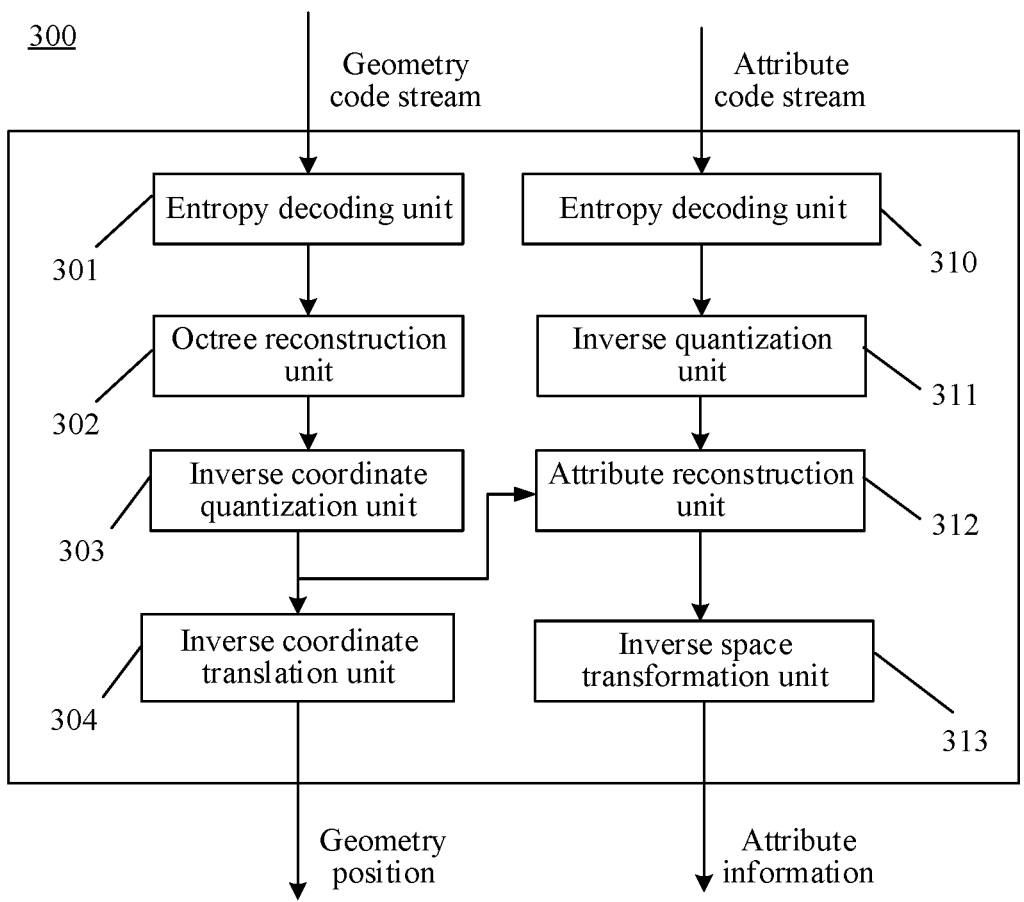
FIG. 3 is a schematic block diagram of a decoding framework according to certain embodiment(s) of the present disclosure.

FIG. 3 is a schematic block diagram of a decoding framework according to an embodiment of the present disclosure.

As shown in FIG. 3, the decoding framework 300 may obtain a code stream of the point cloud from the encoding device, and obtain the position information and attribute information of the points in the point cloud by parsing the code stream. The decoding of the point cloud includes position decoding and attribute decoding.

The process of position decoding includes: performing arithmetic decoding on a geometry code stream; performing combination after constructing an octree, and reconstructing the position information of the points, to obtain reconstructed information of the position information of the points; and performing coordinate transformation on the reconstructed information of the position information of the points to obtain the position information of the points. The position information of the points may also be referred to as geometry information of the points.

The process of attribute decoding includes: parsing the attribute code stream to obtain residual values of the attribute information of the points in the point cloud; performing inverse quantization on the residual values of the attribute information of the points, to obtain residual values of the attribute information of the points after inverse quantization; selecting one of the three prediction modes to perform point cloud prediction based on the reconstructed information of the position information of the points obtained during position decoding, to obtain reconstructed values of the attribute information of the points; and performing color space inverse transformation on the reconstructed values of the attribute information of the points, to obtain a decoded point cloud.

As shown in FIG. 3, position decoding may be implemented by the following units: an entropy decoding unit 301, an octree reconstruction unit 302, an inverse coordinate quantization unit 303, and an inverse coordinate translation unit 304.

Attribute encoding may be implemented by the following units: an entropy decoding unit 310, an inverse quantization unit 311, an attribute reconstruction unit 312, and an inverse space transformation unit 313.

Decoding is an inverse process of encoding, and similarly, for the functions of each unit in the decoding framework 300, reference may be made to the functions of the corresponding unit in the encoding framework 200.

At the decoder side, after obtaining a compressed code stream, the decoder first performs entropy decoding to obtain various mode information, and quantized geometry information and attribute information. On one hand, inverse quantization is performed on the geometry information to obtain reconstructed 3D point position information. On the other hand, inverse quantization is performed on the attribute information to obtain residual information, and a reference signal is confirmed according to the adopted transformation mode, to obtain reconstructed attribute information, which has a one-to-one correspondence with the geometry information in sequence, and outputted reconstructed point cloud data is generated.

For example, the decoding framework 300 may divide the point cloud into a plurality of LoDs according to the Euclidean distance between the points in the point cloud; and subsequently decode the attribute information of the points in the LoD in sequence, for example, calculate a quantity of zeros (zero_cnt) in the zero run length coding technology, to decode residuals based on zero_cnt. Subsequently, the decoding framework 300 may perform inverse quantization based on decoded residual values, and add the residual value after inverse quantization to the predicted value of the current point to obtain a reconstructed value of the point cloud, until all point clouds have been decoded. The current point will serve as the nearest neighbor of points in subsequent LoDs, and the reconstructed value of the current point is used to predict the attribute information of the subsequent points.

As can be seen from FIG. 2, the encoding framework 200 includes two parts functionally: a position encoding module and an attribute encoding module, where the position encoding module is configured to implement encoding of position information of the point cloud, to form a geometric code stream; and the attribute encoding module is configured to implement encoding of attribute information of the point cloud, to form an attribute code stream. The present disclosure relates to encoding of attribute information.

The mode information or parameter information such as prediction, quantization, encoding, and filtering determined during encoding of the attribute information by the encoder side is carried in the attribute code stream when necessary. The decoder side parses the attribute code stream, and analyzes and determines, according to the existing information, mode information or parameter information such as prediction, quantization, encoding, and filtering the same as that on the encoder side, to ensure a reconstructed value of attribute information obtained on the decoder side is the same as a reconstructed value of attribute information obtained on the encoder side.

The description is the process of the point cloud encoder and decoder based on the G-PCC encoding and decoding framework. With the development of technologies, some modules or steps in the framework or process may be adjusted. The present disclosure is applicable to the process of the point cloud encoder and decoder based on the G-PCC encoding and decoding framework, but is not limited to the framework and process.

The technical solution of the present disclosure is described below in detail.

First, the decoder side is used as an example.

Figure 4:
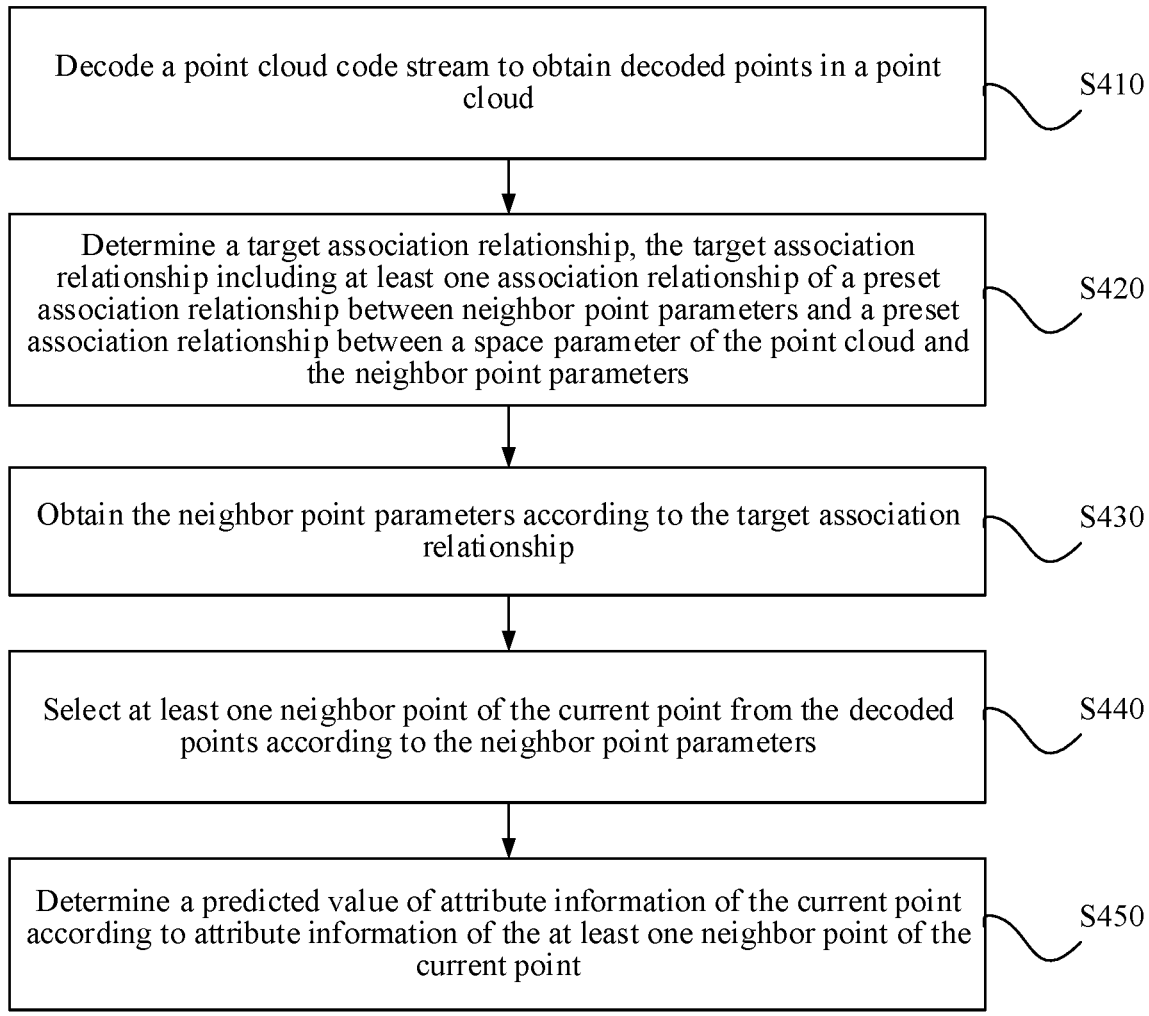
FIG. 4 is a schematic flowchart of a point cloud attribute prediction method according to certain embodiment(s) of the present disclosure.

FIG. 4 is a flowchart of a point cloud attribute prediction method according to an embodiment of the present disclosure. The execution entity of the method is a computing device, and the computing device may be an apparatus having a function of determining a predicted value of a point in a point cloud, for example, a point cloud attribute prediction apparatus. The point cloud attribute prediction apparatus may be the point cloud decoder, or is a part of a point cloud decoder. As shown in FIG. 4, this embodiment includes the following steps:

S410: Decode a point cloud code stream to obtain decoded points in a point cloud.

This embodiment relates to a process of decoding attribute information of a point cloud, the decoding of the attribute information of the point cloud is performed after decoding of position information of the point cloud. The position information of the point cloud may also be referred to as geometry information of the point cloud.

In this embodiment of the present disclosure, the decoded points may be understood as points of which both geometry information and attribute information have been decoded. In certain embodiment(s), the point cloud code stream includes a geometry code stream and an attribute code stream, and the decoder side first decodes the geometry code stream of the point cloud, to obtain reconstructed values of geometry information of points in the point cloud. Subsequently, the decoder side decodes the attribute code stream of the point cloud to obtain reconstructed values of attribute information of the points in the point cloud. The geometry information and the attribute information of the points in the point cloud are combined to obtain a decoded point cloud. This embodiment of the present disclosure relates to the process of decoding the attribute code stream of the point cloud.

In the process of decoding the attribute code stream of the point cloud, the process of decoding each point in the point cloud is the same. A current point to be decoded in the point cloud is used as an example. During determining of attribute information of the current point in the point cloud, decoded points in the point cloud may be obtained, and at least one neighbor point of the current point may be selected from these decoded points. A predicted value of the attribute information of the current point is obtained according to a reconstructed value of attribute information of the at least one neighbor point of the current point, and a reconstructed value of the attribute information of the current point is obtained according to the predicted value of the attribute information of the current point and a residual value of the attribute information of the current point parsed from the attribute code stream of the point cloud.

During the determining of the at least one neighbor point of the current point, neighbor point parameters first may be determined, and the at least one neighbor point of the current point is selected from the decoded points according to the neighbor point parameters. This embodiment of the present disclosure provides a new manner of determining the neighbor point parameters, which is shown in S420 below:

S420: Determine a target association relationship, the target association relationship including at least one association relationship of a preset association relationship between neighbor point parameters and a preset association relationship between a space parameter of the point cloud and the neighbor point parameters.

In certain embodiment(s), the neighbor point parameters include at least one of the following: a quantity N of candidate points of a current point, a quantity K of neighbor points, and a preset distance d between the neighbor point and the current point, both N and K being positive integers, and d being a positive number;

In certain embodiment(s), the space parameter of the point cloud includes at least one of the following: point cloud precision, point cloud density, and a point cloud quantization step. The point cloud precision refers to voxelized data representation precision (voxelized precision) or a bounding box size of the point cloud. The point cloud density refers to a minimum point-to-point distance representation of the point cloud. The point cloud quantization step includes a point cloud geometry quantization step and a point cloud attribute quantization step.

A specific form of the preset association relationship between the neighbor point parameters is not limited in this embodiment of the present disclosure.

For example, the association relationship between the neighbor point parameters may be an additive relationship. For example, a sum of the quantity N of candidate points and the quantity K of neighbor points is equal to a first preset sum value; or a sum of the quantity N of candidate points, the quantity K of neighbor points, and the preset distance d is equal to a second preset sum value; or a sum of the quantity N of candidate points and the quantity K of neighbor points is equal to a third preset sum value; or a sum of the quantity K of neighbor points and the preset distance d is equal to a fourth preset sum value.

For example, the association relationship between the neighbor point parameters may be a subtraction relationship. For example, a difference between the quantity N of candidate points and the quantity K of neighbor points is equal to a first preset difference value; or a difference between the quantity N of candidate points and the preset distance d is equal to a second preset difference value; or a difference between the quantity K of neighbor points and the preset distance d is equal to a third preset difference value.

For example, the association relationship between the neighbor point parameters may be a multiplication relationship. For example, a product of the quantity N of candidate points and the quantity K of neighbor points is equal to a first preset product value; or a product of the quantity N of candidate points and the preset distance d is equal to a second preset product value; or a product of the quantity K of neighbor points and the preset distance d is equal to a third preset product value.

For example, the association relationship between the neighbor point parameters may be a ratio relationship. For example, a ratio of the quantity N of candidate points to the quantity K of neighbor points is equal to a first preset ratio; or a ratio of the quantity N of candidate points to the preset distance d is equal to a second preset ratio; or a ratio of the quantity K of neighbor points to the preset distance d is equal to a third preset ratio.

A specific form of the preset association relationship between the space parameter of the point cloud and the neighbor point parameters is not limited in this embodiment of the present disclosure.

For example, the association relationship between the space parameter of the point cloud and the neighbor point parameters may be a multiple relationship. For example, a ratio of the quantity N of candidate points to the point cloud precision is equal to a first preset multiple; or a ratio of the quantity K of neighbor points to the point cloud precision is equal to a second preset multiple; or a ratio of the preset distance d to the point cloud precision is equal to a third preset multiple; or a ratio of the quantity N of candidate points to the point cloud density is equal to a fourth preset multiple; or a ratio of the quantity K of neighbor points to the point cloud density is equal to a fifth preset multiple; or a ratio of the preset distance d to the point cloud density is equal to a sixth preset multiple.

For example, the association relationship between the space parameter of the point cloud and the neighbor point parameters may be a power relationship. For example, the quantity N of candidate points is equal to a first preset power of the point cloud precision; or the quantity K of neighbor points is equal to a second preset power of the point cloud precision; or the preset distance d is equal to a third preset power of the point cloud precision; or the quantity N of candidate points is equal to a fourth preset power of the point cloud density; or the quantity K of neighbor points is equal to a fifth preset power of the point cloud density; or the preset distance d is equal to a sixth preset power of the point cloud density.

Manners in which the decoder side determines the target association relationship in this embodiment of the present disclosure include, but not limited to, the following:

Manner 1: The target association relationship is carried in the point cloud code stream, and the decoder side decodes the point cloud code stream to obtain the target association relationship.

Manner 2: the target association relationship is negotiated in advance by the encoder side and the decoder side.

S430: Obtain the neighbor point parameters according to the target association relationship.

The target association relationship includes: at least one of a preset association relationship between neighbor point parameters and a preset association relationship between a space parameter of the point cloud and the neighbor point parameters. In other words, the association relationship between the neighbor point parameters may be used to determine the quantity N of candidate points of the current point, the quantity K of neighbor points, and the preset distance d between the neighbor point and the current point; or the association relationship between the space parameter of the point cloud and the neighbor point parameters may be used to determine the quantity N of candidate points of the current point, the quantity K of neighbor points, and the preset distance d between the neighbor point and the current point; or the association relationship between the neighbor point parameters may be used to determine some parameters in the quantity N of candidate points, the quantity K of neighbor points, and the preset distance d between the neighbor point and the current point, and the association relationship between the space parameter of the point cloud and the neighbor point parameters may be used to determine other parameters in the quantity N of candidate points, the quantity K of neighbor points, and the preset distance d between the neighbor point and the current point.

The following respectively describes the process of obtaining the neighbor point parameters according to the target association relationship when or in response to a determination that the target association relationship is the preset association relationship between the neighbor point parameters or the preset association relationship between the space parameter of the point cloud and the neighbor point parameters.

Implementation 1: The target association relationship is the preset association relationship between the neighbor point parameters.

In a possible implementation, the association relationship between the neighbor point parameters includes an association relationship between a reference parameter and a non-reference parameter in the neighbor point parameters.

The reference parameter may be understood as a neighbor point parameter obtained by direct decoding, or is a preset neighbor point parameter, and the non-reference parameter may be understood as a neighbor point parameter calculated through an association relationship. In other words, the reference parameter is a neighbor point parameter that may be obtained without calculation, and the non-reference parameter is a neighbor point parameter obtained through calculation.

In some embodiments, when or in response to a determination that the target association relationship includes the association relationship between the reference parameter and the non-reference parameter in the neighbor point parameters, S430 includes S430-A1 and S430-A2:

S430-A1: Determine the reference parameter in the neighbor point parameters.

S430-A2: Determine the non-reference parameter in the neighbor point parameters according to the reference parameter in the neighbor point parameters and the association relationship between the reference parameter and the non-reference parameter in the neighbor point parameters.

The implementations of S430-A1 include, but not limited to, the following:

Manner 1: The encoder side carries the reference parameter in the neighbor point parameters in the point cloud code stream, and the decoder side decodes the point cloud code stream to obtain the reference parameter in the neighbor point parameters.

Manner 2: The reference parameter in the neighbor point parameters is preset. For example, the reference parameter is N, and a preset value of N is 10.

In the manner, after the reference parameter in the neighbor point parameters is obtained, the determining the non-reference parameter in the neighbor point parameters according to the association relationship between the reference parameter and the non-reference parameter in the neighbor point parameters in S430-A2 is performed. The implementations of S430-A2 include, but not limited to, the following manners:

Manner 1: When or in response to a determination that the reference parameter in the neighbor point parameters includes a first reference parameter, S430-A2 includes: determining a first non-reference parameter and a second non-reference parameter according to the first reference parameter, an association relationship between the first reference parameter and the first non-reference parameter in the neighbor point parameters, and an association relationship between the first reference parameter and the second non-reference parameter in the neighbor point parameters.

The first reference parameter is any one of N, K, and d, and the first non-reference parameter and the second non-reference parameter are parameters in the neighbor point parameters other than the first reference parameter.

Example 1: The first reference parameter is the quantity N of candidate points, the preset distance d is calculated according to the quantity N of candidate points and the association relationship between the preset distance d and the quantity N of candidate points, and the quantity K of neighbor points is calculated according to the quantity N of candidate points and the association relationship between the quantity k of neighbor points and the quantity N of candidate points.

The association relationship may be a preset mapping function.

In certain embodiment(s), the mapping function may be a ratio. For example, the preset distance d is calculated according to the quantity N of candidate points and a first ratio of the preset distance d to the quantity N of candidate points. The quantity K of neighbor points is calculated according to the quantity N of candidate points and a second ratio of the quantity K of neighbor points to the quantity N of candidate points.

Example 2: The first reference parameter is the quantity K of neighbor points, the preset distance d is calculated according to the quantity K of neighbor points and the association relationship between the preset distance d and the quantity K of neighbor points, and the quantity N of candidate points is calculated according to the quantity K of neighbor points and the association relationship between the quantity k of neighbor points and the quantity N of candidate points.

The association relationship may be a preset mapping function.

In certain embodiment(s), the mapping function may be a ratio. For example, the preset distance d is calculated according to the quantity K of neighbor points and a third ratio of the preset distance d to the quantity K of neighbor points. The quantity N of candidate points is calculated according to the quantity K of neighbor points and a fourth ratio of the quantity K of neighbor points to the quantity N of candidate points.

Example 3: The first reference parameter is the preset distance d, the quantity K of neighbor points is calculated according to the preset distance d and the association relationship between the preset distance d and the quantity K of neighbor points, and the quantity N of candidate points is calculated according to the preset distance d and the association relationship between the preset distance d and the quantity N of candidate points.

The association relationship may be a preset mapping function.

In certain embodiment(s), the mapping function may be a ratio. For example, the quantity K of neighbor points is calculated according to the preset distance d and a fifth ratio of the preset distance d to the quantity K of neighbor points. The quantity N of candidate points is calculated according to the preset distance d and a sixth ratio of the preset distance d to the quantity N of candidate points.

It is to be understood that the association relationship between the first reference parameter and the first non-reference parameter and the association relationship between the first reference parameter and the second non-reference parameter described are only examples. The two association relationships may also be other relationships, which are not limited in the present disclosure.

Manner 2: When or in response to a determination that the reference parameter in the neighbor point parameters includes a first reference parameter and a second reference parameter, a third non-reference parameter is determined according to an association relationship between the first reference parameter and the third non-reference parameter in the neighbor point parameters or an association relationship between the second reference parameter and the third non-reference parameter in the neighbor point parameters.

The third non-reference parameter is any one of N, K, and d, and the first reference parameter and the second reference parameter are parameters in the neighbor point parameters other than the third non-reference parameter.

Example 1: The first reference parameter is the quantity N of candidate points, and the second reference parameter is the quantity K of neighbor points, the preset distance d is calculated according to the quantity N of candidate points and the association relationship between the quantity N of candidate points and the preset distance d, or the preset distance d is calculated according to the quantity K of neighbor points and the association relationship between the quantity K of neighbor points and the preset distance d.

The association relationship may be a preset mapping function.

In certain embodiment(s), the mapping function may be a ratio. For example, the preset distance d is calculated according to the quantity N of candidate points and a ratio 1 of the quantity N of candidate points to the preset distance d, or the preset distance d is calculated according to the quantity K of neighbor points and a ratio 2 of the quantity K of neighbor points to the preset distance d.

Example 2: The first reference parameter is the quantity N of candidate points, and the second reference parameter is the preset distance d, the quantity K of neighbor points is calculated according to the quantity N of candidate points and the association relationship between the quantity N of candidate points and the quantity K of neighbor points, or the quantity K of neighbor points is calculated according to the preset distance d and the association relationship between the quantity K of neighbor points and the preset distance d.

The association relationship may be a preset mapping function.

In certain embodiment(s), the mapping function may be a ratio. For example, the quantity K of neighbor points is calculated according to the quantity N of candidate points and a ratio 3 of the quantity N of candidate points to the quantity K of neighbor points, or the quantity K of neighbor points is calculated according to the preset distance d and a ratio 4 of the quantity K of neighbor points to the preset distance d.

Example 3: The first reference parameter is the quantity K of neighbor points, and the second reference parameter is the preset distance d, the quantity N of candidate points is calculated according to the quantity K of neighbor points and the association relationship between the quantity N of candidate points and the quantity K of neighbor points, or the quantity N of candidate points is calculated according to the preset distance d and the association relationship between the quantity N of candidate points and the preset distance d.

The association relationship may be a preset mapping function.

In certain embodiment(s), the mapping function may be a ratio. For example, the quantity N of candidate points is calculated according to the quantity K of neighbor points and a ratio 5 of the quantity N of candidate points to the quantity K of neighbor points, or the quantity N of candidate points is calculated according to the preset distance d and a ratio 6 of the quantity N of candidate points to the preset distance d.

It is to be understood that the association relationship between the first reference parameter and the third non-reference parameter and the association relationship between the second reference parameter and the third non-reference parameter described are only examples. The two association relationships may also be other relationships, which are not limited in the present disclosure.

Manner 3: The quantity N of candidate points, the quantity K of neighbor points, and the preset distance d are determined according to the association relationship between the quantity N of candidate points, the quantity K of neighbor points, and the preset distance d.

What is described is the process of obtaining the neighbor point parameters of the current point according to the association relationship between the neighbor point parameters when or in response to a determination that the target association relationship is the preset association relationship between the neighbor point parameters. The following describes the process of obtaining the neighbor point parameters of the current point according to the association relationship between the space parameter of the point cloud and the neighbor point parameters when or in response to a determination that the target association relationship is the preset association relationship between the space parameter of the point cloud and the neighbor point parameters with reference to implementation 2.

Implementation 2: The target association relationship is the preset association relationship between the space parameter of the point cloud and the neighbor point parameters.

The space parameter of the point cloud includes at least one of point cloud precision, point cloud density, and a point cloud quantization step.

In implementation 2, the implementations of S430 include, but not limited to, the following:

Manner 1: When or in response to a determination that the space parameter of the point cloud includes the point cloud precision, S430 includes: determining the quantity N of candidate points according to an association relationship between the point cloud precision and the quantity N of candidate points, for example, acquiring the point cloud precision, and determining a multiple or power of the point cloud precision as the quantity N of candidate points.

Manner 2: When or in response to a determination that the space parameter of the point cloud includes the point cloud density, S430 includes: determining the preset distance d according to an association relationship between the point cloud density and the preset distance d, for example, acquiring the point cloud density, and determining a multiple of the point cloud density as the preset distance d.

Manner 3: When or in response to a determination that the space parameter of the point cloud includes the point cloud precision, S430 includes: determining the quantity K of neighbor points according to an association relationship between the point cloud precision and the quantity K of neighbor points, for example, acquiring the point cloud precision, and determining a multiple of the point cloud precision as the quantity K of neighbor points.

Manner 4: When or in response to a determination that the space parameter of the point cloud includes the point cloud quantization step, S430 includes: determining the quantity N of candidate points according to an association relationship between the point cloud quantization step and the quantity N of candidate points, for example, acquiring the point cloud quantization step, and determining a multiple of the point cloud quantization step as the quantity N of candidate points.

The association relationship in Manners 1 to 4 may be one of a preset function relationship, a preset operation relationship, and a preset mapping relationship, or any combination thereof, which is not limited in this embodiment of the present disclosure.

In some embodiments, manners of acquiring the space parameter of the point cloud such as the point cloud density, the point cloud precision, and the point cloud quantization step include, but not limited to, the following manners:

Manner 1: The encoder side carries the space parameter of the point cloud in the point cloud code stream, and the decoder side parses the point cloud code stream to obtain the space parameter of the point cloud.

Manner 2: The point cloud code stream is parsed to obtain geometry information of points in the point cloud, and the space parameter of the point cloud is determined according to the geometry information of the points in the point cloud. For example, the point cloud density is obtained according to the geometry information of the points in the point cloud, or a minimum point-to-point distance in the point cloud is obtained according to the geometry information of the points in the point cloud, and the minimum distance is determined as the point cloud density.

After the neighbor point parameters of the current point are determined in the manner, S440 is performed.

S440: Select at least one neighbor point of the current point from the decoded points according to the neighbor point parameters.

In some embodiments, the at least one neighbor point of the current point is selected from the decoded points according to at least one of the quantity N of candidate points of the current point, the quantity K of neighbor points, and the preset distance d. For example, K points are selected from the decoded points as neighbor points of the current point. Alternatively, points with a distance to the current point less than the preset distance d are selected from the decoded points as neighbor points of the current point. Alternatively, N candidate points are selected from the decoded points, and points with a distance to the current point less than a preset distance threshold are selected from the N candidate points as neighbor points of the current point.

For example, the attribute information of the current point includes at least one of a color attribute and a reflectivity attribute, and manners of determining the neighbor points of the current point may be different during encoding of different attribute information of the current point.

Figure 5A:
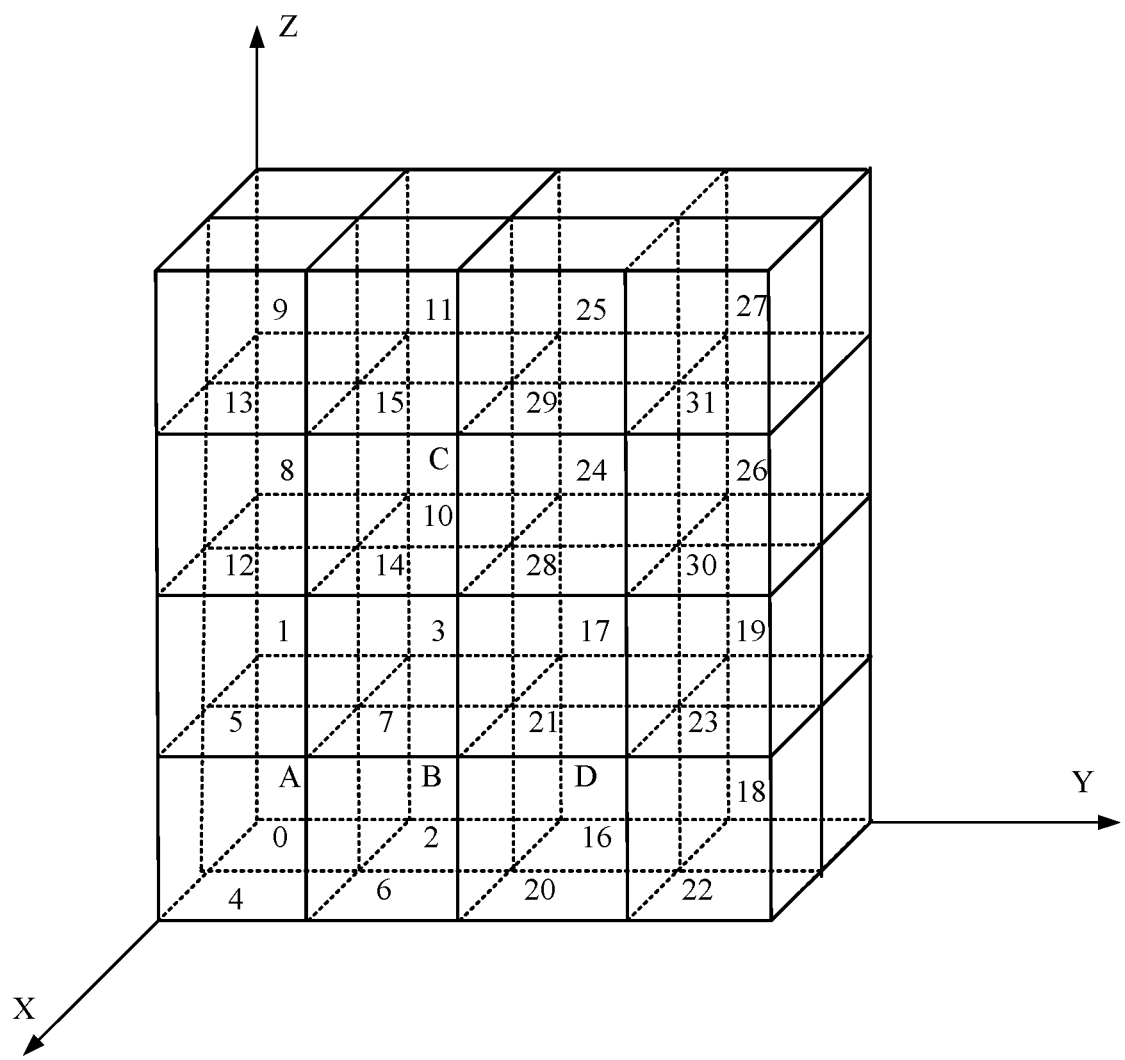
FIG. 5a is a schematic diagram of arrangement of a point cloud in an original Morton order.

Example 1: When or in response to a determination that the attribute information of the current point is reflectivity information, it is determined that the manners of determining the neighbor points of the current point include, but not limited to, the following manners:

Manner 1: When the reflectivity attribute of the current point is predicted, the Morton order may be used to select the neighbor points of the current point, which is:

acquiring coordinates of all point clouds in point cloud data, and a Morton order 1 is obtained according to Morton sorting, as shown in FIG. 5a.

Figure 5B:
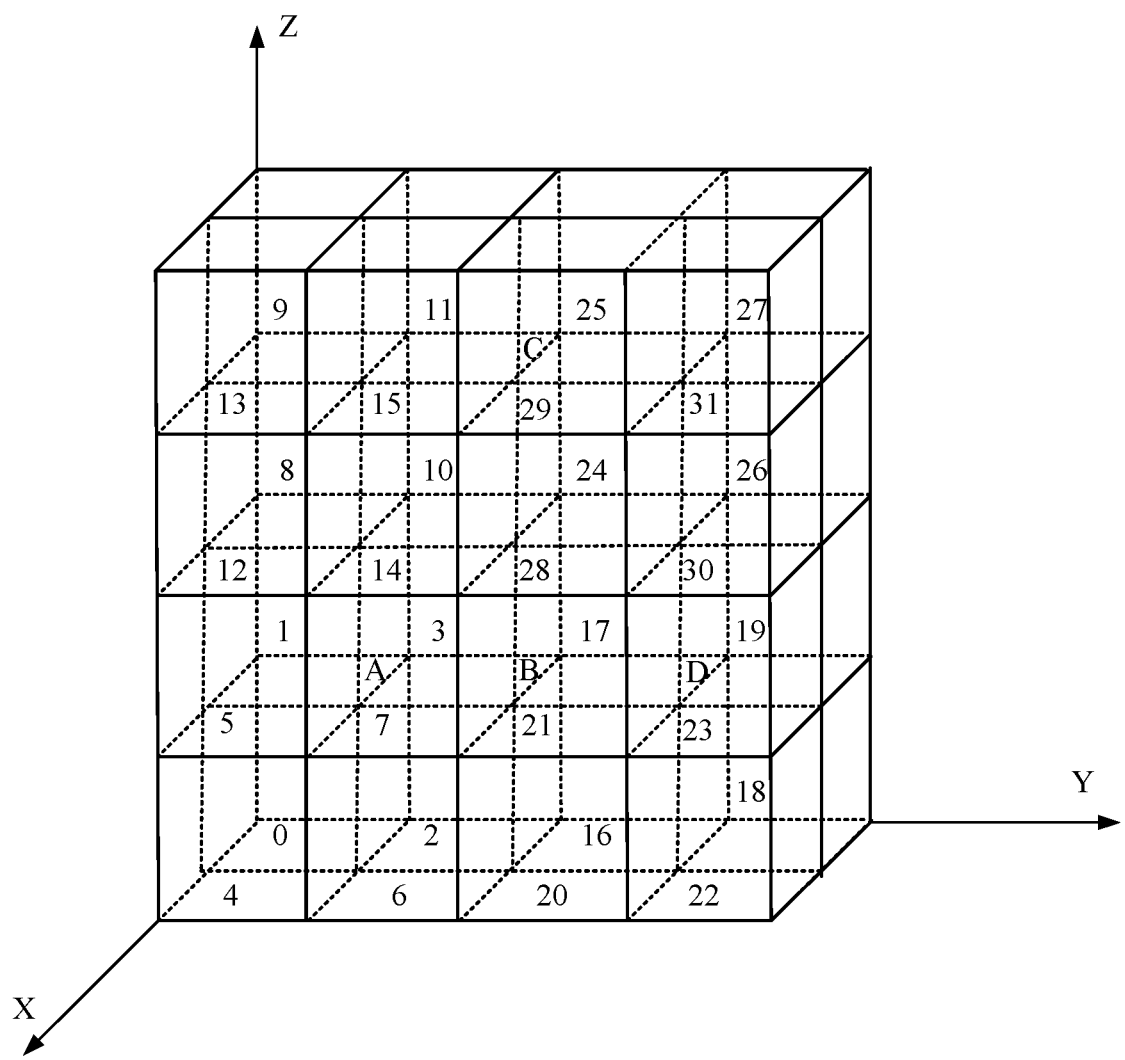
FIG. 5b is a schematic diagram of arrangement of a point cloud in an offset Morton order.

Subsequently, a fixed value (j1, j2, j3) is added based on the coordinates (x, y, z) of all point clouds, the new coordinates (x+j1, y+j2, z+j3) are used to generate Morton codes corresponding to the point clouds, and a Morton order 2 is obtained according to Morton sorting, as shown in FIG. 5b. When A, B, C, and D in FIG. 5a move to different positions in FIG. 5b, the corresponding Morton codes also change, but their relative positions remain unchanged. In addition, in FIG. 5b, the Morton code of the point D is 23, and the Morton code of a neighbor point B of the point D is 21, so that the point B can be found by searching at most two points forward from the point D. However, in FIG. 5a, the point B (Morton code 2) can only be found by searching 14 points forward from point D (Morton code 16).

Encoding is performed according to the Morton order, and the nearest predicted points of the current point are searched. The first N1 decoded points of the current point are selected from Morton order 1 as N1 neighbor points of the current point, where N1 is greater than or equal to 1; the first N2 decoded points of the current point are selected from Morton order 2 as N2 neighbor points of the current point, where N2 is greater than or equal to 1; and N1+N2 neighbor points of the current point are obtained, where N1+N2=N.

In certain embodiment(s), in PCEM software, j1=j2=j3=42.

Manner 2: The first maxNumOfNeighbours decoded points of the current point in the Hilbert order are calculated, and the maxNumOfNeighbours decoded points are used as neighbor points of the current point.

In certain embodiment(s), a default value of maxNumOfNeighbours is N.

Figure 5C:
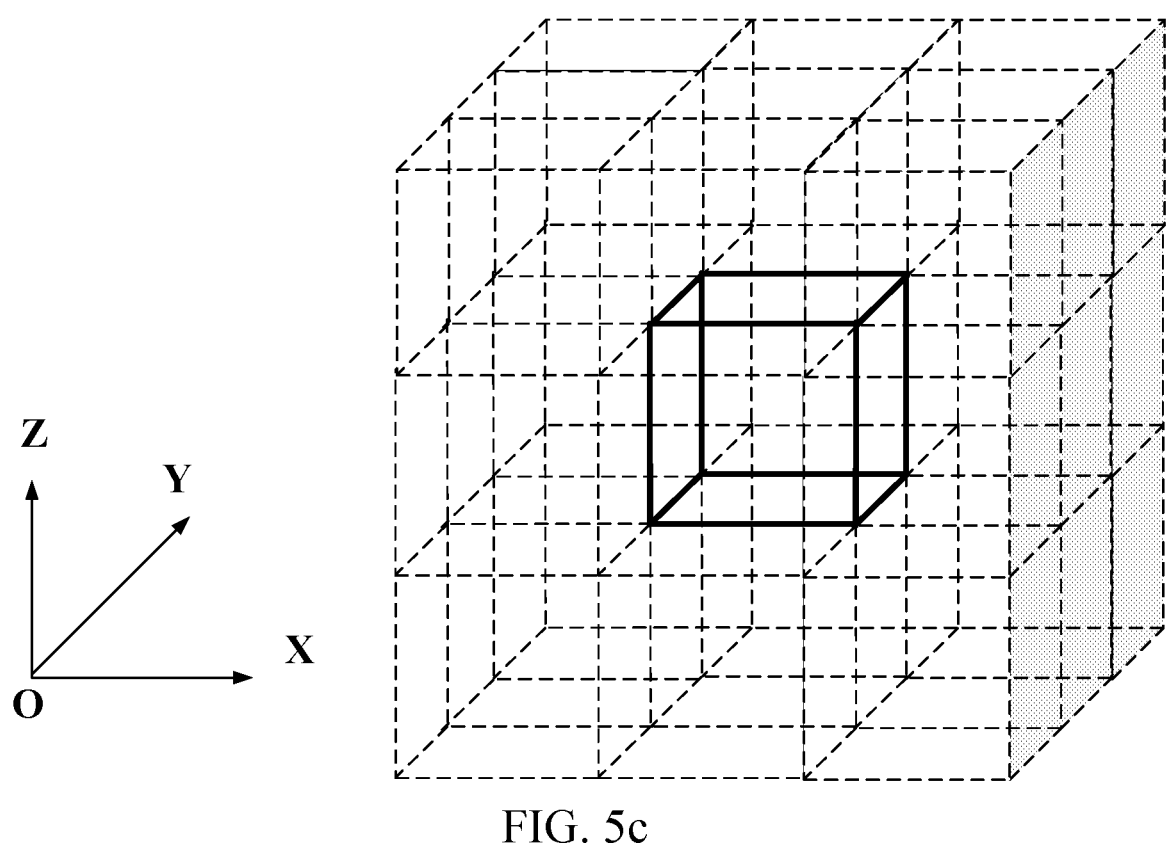
FIG. 5c is a schematic diagram of a spatial relationship between adjacent points of a current point.
Figure 5D:
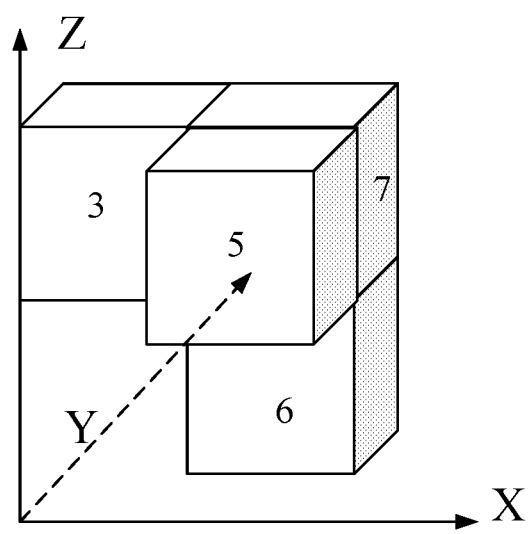
FIG. 5d is a schematic diagram of a Morton code relationship between adjacent points coplanar with a current point.
Figure 5E:
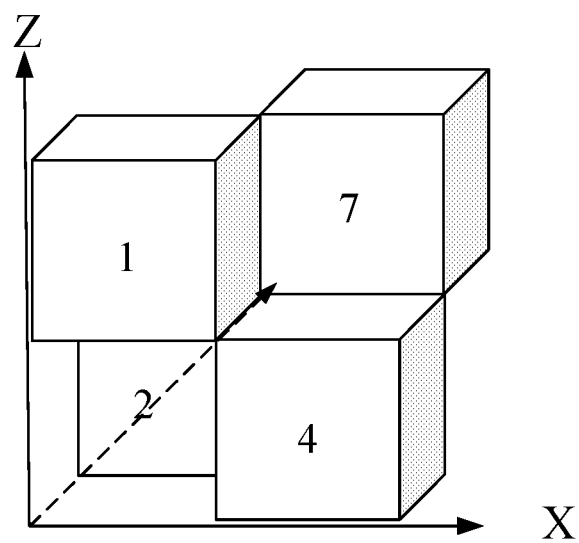
FIG. 5*e* is a schematic diagram of a Morton code relationship between adjacent points collinear with a current point.

Example 2: When or in response to a determination that the attribute information of the current point is color information, it is determined that the manner of determining the neighbor points of the current point includes the following content:

A spatial relationship of the neighbor points of the current point is shown in FIG. 5c, in which the solid line box represents the current point, and it is assumed that a search range of the neighbor points is a 3×3×3 neighborhood of the current point. Firstly, the Morton code of the current point is used to obtain a block with the smallest Morton code value in the 3×3×3 neighborhood, and the block is used as a reference block. Decoded neighbor points coplanar and collinear with the current point are searched for by using the reference block. A Morton code relationship between the neighbor points coplanar with the current point in the neighborhood range is shown in FIG. 5d, and the Morton code relationship between the neighbor points collinear with the current point is shown in FIG. 5e below.

The decoded N neighbor points coplanar and collinear with the current point are searched for by using the reference block.

In some embodiments, S440 includes S440-A1 and S440-A2:

S440-A1: Select N candidate points of the current point from the decoded points in the point cloud.

S440-A2: Select the at least one neighbor point of the current point from the N candidate points according to at least one of the quantity K of neighbor points and the preset distance d.

Manners of the selecting N candidate points of the current point from the decoded points in the point cloud in S440-A1 include, but not limited to, the following manners:

Manner 1: The decoded points are sorted according to a Morton order, a Hilbert order, or an encoding order, and the first N points are selected from the sorted decoded points. In certain embodiment(s), the N points may be consecutive points. For example, points with sequence numbers of i−1, i−2, . . . , i−N+1 are selected as candidate points. In certain embodiment(s), the N points may be inconsecutive points. For example, the N points are points equally spaced apart.

Manner 2: The decoded points are sorted according to a Morton order, a Hilbert order, or an encoding order, and N consecutive points are selected from the sorted decoded points. For example, the first N1 points are skipped, that is, points with sequence numbers of i−N1+1, i−N1+2, . . . , i−N1−N+1 are selected.

After the N candidate points of the current point are selected in the manner, S440-A2 is performed.

In some embodiments, the manner of the selecting the at least one neighbor point of the current point from the N candidate points according to at least one of the quantity K of neighbor points and the preset distance d in S440-A2 includes S440-A21:

S440-A21: Select, from the N candidate points, at least one candidate point meeting a target condition as the at least one neighbor point of the current point, the target condition including at least one condition of the following condition 1 to condition 4:

Condition 1: A distance to the current point in each dimension is less than a first preset distance. That is, candidate points with a distance to the current point in each dimension being less than a first preset distance in the N candidate points are determined as neighbor points of the current point.

The distance between the candidate point and the current point in each dimension may be understood as a distance between the candidate point and the current point in each dimension, every two dimensions, or three dimensions of the three dimensions x, y, and z. For example, it is assumed that coordinates of the current point are (x1, y1, z1) and coordinates of the candidate point are (x2, y2, z2), a Manhattan distance between the current point and the candidate point in each dimension includes: dx=|x1−x2|, dy=|y1−y2|, dz=|z1−z2|, dxy=|x1−x2|+|y1−y2|, dxz=|x1−x2|+|z1−z2|, dyz=|z1−z2|+|y1−y2|, dxyz=|x1−x2|+|y1−y2|+|z1−z2|. The Manhattan distance is used as an example above. In certain embodiment(s), the distance between the candidate point and the current point in each dimension may alternatively be determined based on other methods for calculating a distance such as the Euclidean distance.

Condition 2: A distance to the current point in each dimension is equal to a second preset distance. That is, candidate points with a distance to the current point in each dimension being equal to a second preset distance in the N candidate points are determined as neighbor points of the current point.

Condition 3: K candidate points closest to the current point. That is, the K candidate points closest to the current point in the N candidate points are determined as neighbor points of the current point.

Condition 4: The first K candidate points in the N candidate points obtained through sorting in a preset order. That is, the N candidate points are sorted in the preset order, and the first K candidate points in the N candidate points are determined as neighbor points of the current point. The preset order may be a Morton order, a Hilbert order, an encoding order, an input order, or the like.

In this step, the condition 1 to condition 4 may be used alone or in combination under a certain condition. For example, neighbor points are first selected according to condition 1 and condition 2, and if there is no neighbor point meeting condition 1 and condition 2, condition 3 or condition 4 is used to select neighbor points. Alternatively, neighbor points are first selected according to condition 1 and condition 2, and if there are more than K selected neighbor points, K points are selected according to condition 4 from the plurality of neighbor points selected based on condition 1 and condition 2 as neighbor points.

The at least one neighbor point of the current point is obtained according to step S440, and subsequently S450 below is performed.

S450: Determine a predicted value of attribute information of the current point according to attribute information of the at least one neighbor point of the current point.

In some embodiments, an average value of the attribute information of the at least one neighbor point is determined as the predicted value of the attribute information of the current point.

In some embodiments, a weighted average value of the attribute information of the at least one neighbor point is determined as the predicted value of the attribute information of the current point. In this manner, S450 includes:

S450-A1: Determine an attribute weight of each of the at least one neighbor point of the current point.

S450-A2: Determine the predicted value of the attribute information of the current point according to the attribute information and the attribute weight of the at least one neighbor point of the current point.

Manners of the determining an attribute weight of each of the at least one neighbor point of the current point in S450-A1 include, but not limited to, the following manners:

Manner 1: A weight value of each neighbor point is calculated according to the distance between the neighbor point and the current point, for example, using a reciprocal of the distance as the attribute weight of the neighbor point. In certain embodiment(s), the distance may be a Manhattan distance or a Euclidean distance.

For example, the attribute weight of the neighbor point is determined according to the following Formula (1):

$$w_{ij} = \frac{1}{|xi - xij| + |yi - yij| + |zi - zij|} \quad (1)$$

where wij is the attribute weight of the jth neighbor point of the current point i, (xi, yi, zi) is geometry information of the current point, and (xij, yij, zij) is geometry information of the jth neighbor point.

For example, the attribute weight of the neighbor point is determined according to the following Formula (2):

$$w_{ij} = \frac{1}{a|xi - xij| + b|yi - yij| + c|zi - zij|} \quad (2)$$

where a is a weight coefficient of a first component of the current point, b is a weight coefficient of a second component of the current point, and c is a weight coefficient of a third component of the current point. In certain embodiment(s), a, b, and c can be obtained by looking up a table, or are preset fixed values.

Manner 2: The attribute weight of each of the at least one neighbor point of the current point is determined from at least one preset weight.

In an example of Manner 2, when or in response to a determination that the at least one preset weight includes one preset weight, it is determined that the attribute weight of each of the at least one neighbor point is the preset weight.

In an example of Manner 2, for each of the at least one neighbor point when or in response to a determination that the at least one preset weight includes a plurality of preset weights, a first distance between the neighbor point and the current point is determined according to geometry information of the neighbor point and geometry information of the current point, and the attribute weight of the neighbor point is determined from the plurality of preset weights according to the first distance between the neighbor point and the current point.

In certain embodiment(s), a weight interval between the first preset weight and the second preset weight is equal to a preset interval.

For example, the distances between the current point and the at least one neighbor point are respectively d1, d2, ..., dk (d1≤d2≤ ... ≤dk). An initial weight value is set to η, the weight interval is set to Δ, and p discrete weight values are set to [η, η+Δ, η+2*Δ, ..., η+(p−1)*Δ]. If η≤dj<η+Δ, the attribute weight corresponding to the neighbor point j is η; if η+Δ≤dj<η+2*Δ, the attribute weight corresponding to the neighbor point j is η+Δ, and so on.

In an example of Manner 2, it is determined that the attribute weight of the neighbor point is a third preset weight in the plurality of preset weights when or in response to a determination that the first distance is less than or equal to a first threshold, and it is determined that the attribute weight of the neighbor point is a fourth preset weight in the plurality of preset weights when or in response to a determination that the first distance is greater than the first threshold, the third preset weight being less than the fourth preset weight.

In a possible implementation, one or more distance values are selected according to a distribution of d1, d2, ..., dk to calculate the weight values. For example, the first threshold is the median value of the first distances between all of the at least one neighbor point of the current point and the current point, that is, a median point of d1, d2, ..., dk is the first threshold; and if the first distance between a neighbor point and the current point is less than or equal to the first threshold, it is determined that the attribute weight of the neighbor point is the third preset weight, for example, 1. If the first distance between a neighbor point and the current point is greater than the first threshold, it is determined that the attribute weight of the neighbor point is the fourth preset weight, for example, 2.

In a possible implementation, the weight value is calculated according to a distance value distribution and a geometry parameter. For example, the first threshold is a multiple of the point cloud precision. If the first distance between the neighbor point and the current point is less than or equal to the multiple of the point cloud precision, it is determined that the weight of the neighbor point is the third preset weight, for example, 1. If the first distance between the neighbor point and the current point is greater than the multiple of the point cloud precision, it is determined that the weight of the neighbor point is the fourth preset weight, for example, 2.

In a possible implementation, when or in response to a determination that a quantity of the plurality of preset weights is the same as that of the at least one neighbor point, the at least one neighbor point is sorted according to magnitudes of the first distances between the current point and the at least one neighbor point, the plurality of preset weights are sorted according to magnitudes of the plurality of preset weights, and the sorted preset weights are determined as the attribute weights of the sorted at least one neighbor point in a one-to-one correspondence manner. For example, the sorted preset weights in descending order are: a1, a2, a3, and the at least one neighbor point is sorted in descending order of the magnitudes of the first distances between the at least one neighbor point and the current point as: A2, A1, A3. In this way, it is determined that the attribute weight of the neighbor point A2 is a1, the attribute weight of the neighbor point A1 is a2, and the attribute weight of the neighbor point A3 is a3.

In a possible implementation, for each of the at least one neighbor point when or in response to a determination that a quantity of the plurality of preset weights is different from that of the at least one neighbor point, a preset weight in the plurality of preset weights that is closest to a reciprocal of the first distance corresponding to the neighbor point is determined as the attribute weight of the neighbor point.

According to the manners, the attribute weight of each of the at least one neighbor point of the current point is determined. Subsequently, the predicted value of the attribute information of the current point is determined according to the attribute weight and the attribute information of each neighbor point. For example, a weighted value of the attribute information of the attribute weights of the at least one neighbor point of the current point is calculated according to the attribute weight of each neighbor point, and the weighted value is determined as the predicted value of the attribute information of the current point.

The attribute information of the neighbor point of the current point refers to reconstructed attribute information of the neighbor point.

In some embodiments, this embodiment of the present disclosure further includes a process of decoding other point cloud attribute information. For example, a point cloud code stream is decoded, to obtain a quantized residual value of the attribute information of the current point, and subsequently inverse quantization is performed on the quantized residual value of the attribute information of the current point, to obtain the residual value of the attribute information of the current point. Subsequently, a reconstructed value of the attribute information of the current point is determined according to the residual value of the attribute information of the current point and the predicted value of the attribute information of the current point obtained through the steps. For example, a sum of the residual value of the attribute information of the current point and the predicted value of the attribute information of the current point obtained through the steps is used as the reconstructed value of the attribute information of the current point.

In the point cloud attribute prediction method provided in this embodiment of the present disclosure, a point cloud code stream is decoded to obtain decoded points in a point cloud; a target association relationship is determined, the target association relationship including at least one association relationship of a preset association relationship between neighbor point parameters and a preset association relationship between a space parameter of the point cloud and the neighbor point parameters; the neighbor point parameters are obtained according to the target association relationship, the neighbor point parameters including at least one of a quantity N of candidate points of the current point, a quantity K of neighbor points, and a preset distance d between the neighbor point and the current point; at least one neighbor point of the current point is selected from the decoded points according to the neighbor point parameters; and a predicted value of attribute information of the current point is determined according to attribute information of the at least one neighbor point of the current point. That is, in the present disclosure, neighbor point parameters are determined based on a target association relationship, which, compared with the manner of directly presetting the neighbor point parameters, enriches the manners of determining a predicted value of a point cloud attribute. In addition, compared with the existing setting of the neighbor point parameters based on experience, determining the neighbor point parameters according to the target association relationship in the embodiments of the present disclosure can improve the accuracy of the determined neighbor point parameters, and a predicted value of attribute information of a current point can be determined based on the determined neighbor point parameters, thereby improving the decoding efficiency.

The point cloud attribute prediction method of the decoder side is described with reference to FIG. 4, and the technical solution of the present disclosure is described below by using the encoder side as an example with reference to FIG. 6.

Figure 6:
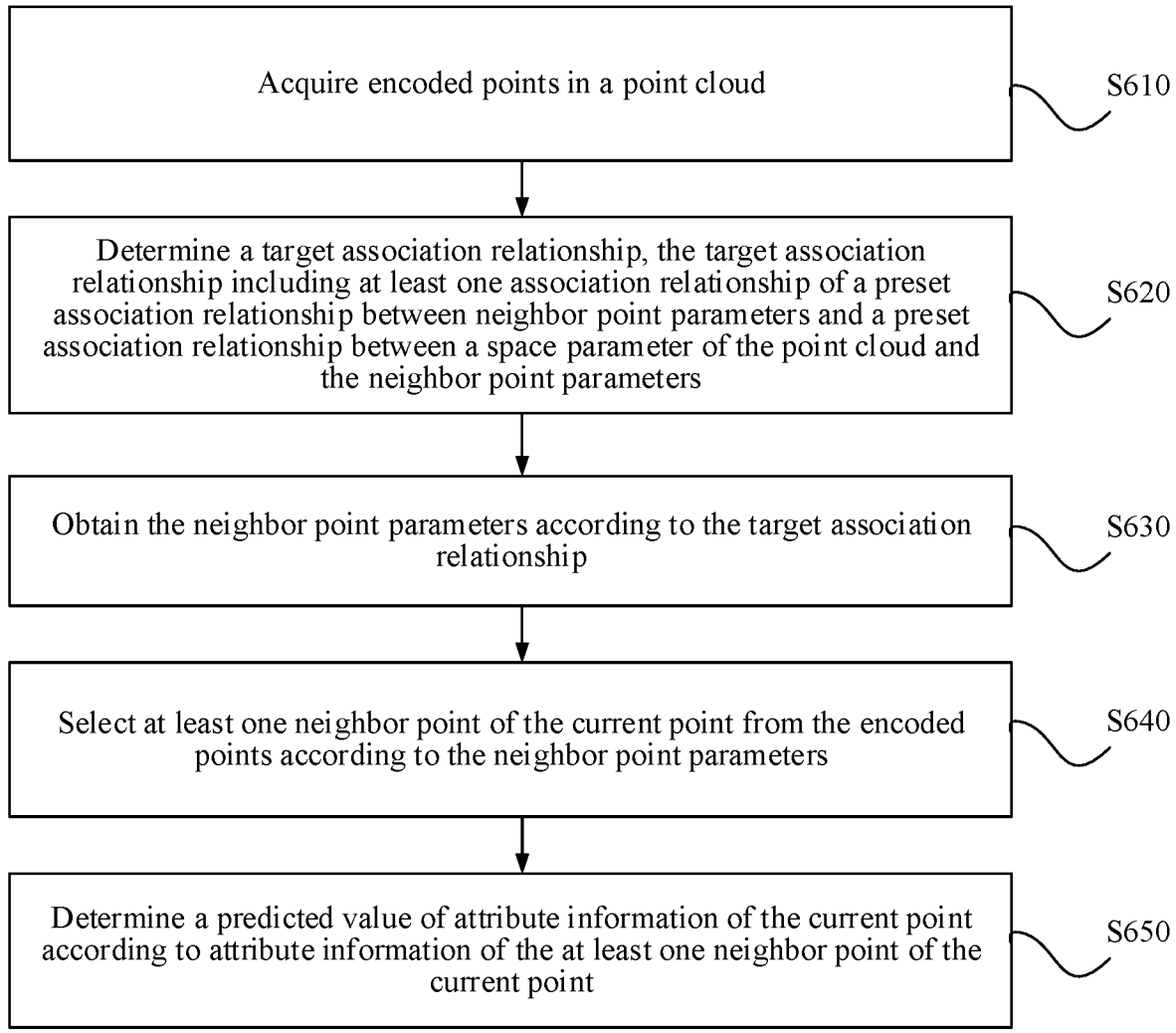
FIG. 6 is a schematic flowchart of a point cloud attribute prediction method according to certain embodiment(s) of the present disclosure.

FIG. 6 is a flowchart of a point cloud attribute prediction method according to an embodiment of the present disclosure. The execution entity of the method is a computing device, which may be an apparatus having a function of determining a predicted value of a point in a point cloud, for example, a point cloud attribute prediction apparatus. The point cloud attribute prediction apparatus may be the point cloud encoder, or is a part of a point cloud encoder. As shown in FIG. 6, this embodiment includes the following steps:

S610: Acquire encoded points in a point cloud.

S620: Determine a target association relationship, the target association relationship including at least one association relationship of a preset association relationship between neighbor point parameters and a preset association relationship between a space parameter of the point cloud and the neighbor point parameters.

In some embodiments, the encoder side may alternatively carry the target association relationship in the point cloud code stream, so that the decoder side may parse the target association relationship from the point cloud code stream.

S630: Obtain the neighbor point parameters according to the target association relationship.

The neighbor point parameters include at least one of a quantity N of candidate points of a current point, a quantity K of neighbor points, and a preset distance d between the neighbor point and the current point, both N and K being positive integers, and d being a positive number.

Implementation 1: The association relationship between the neighbor point parameters includes an association relationship between a reference parameter and a non-reference parameter in the neighbor point parameters.

In some embodiments, when or in response to a determination that the target association relationship includes the association relationship between the reference parameter and the non-reference parameter in the neighbor point parameters, S630 includes:

S630-A1: Determine the reference parameter in the neighbor point parameters. In certain embodiment(s), the reference parameter is preset.

S630-A2: Determine the non-reference parameter in the neighbor point parameters according to the reference parameter in the neighbor point parameters and the association relationship between the reference parameter and the non-reference parameter in the neighbor point parameters.

The implementations of S630-A2 include, but not limited to, the following:

Manner 1: When or in response to a determination that the reference parameter in the neighbor point parameters includes a first reference parameter, a first non-reference parameter and a second non-reference parameter are determined according to the first reference parameter and an association relationship between the first reference parameter and the first non-reference parameter and the second non-reference parameter in the neighbor point parameters, the first reference parameter being any one of the quantity N of candidate points, the quantity K of neighbor points, and the preset distance d between the neighbor point and the current point, and the first non-reference parameter and the second non-reference parameter being parameters in the neighbor point parameters other than the first reference parameter.

Manner 2: When or in response to a determination that the reference parameter in the neighbor point parameters includes a first reference parameter and a second reference parameter, a third non-reference parameter is determined according to an association relationship between the first reference parameter and the third non-reference parameter in the neighbor point parameters or an association relationship between the second reference parameter and the third non-reference parameter in the neighbor point parameters, the third non-reference parameter being any one of the quantity N of candidate points, the quantity K of neighbor points, and the preset distance d between the neighbor point and the current point, and the first reference parameter and the second reference parameter being parameters in the neighbor point parameters other than the third non-reference parameter.

In some embodiments, the encoder side may alternatively carry the reference parameter in the neighbor point parameters in the point cloud code stream, so that the decoder side may obtain the reference parameter from the point cloud code stream.

Implementation 2: The target association relationship includes the association relationship between the space parameter of the point cloud and the neighbor point parameters.

The space parameter of the point cloud includes at least one of point cloud precision, point cloud density, and a point cloud quantization step.

In implementation 2, S630 includes, but not limited to, the following manners:

Manner 1: When or in response to a determination that the space parameter of the point cloud includes the point cloud precision, S630 includes: determining the quantity N of candidate points according to an association relationship between the point cloud precision and the quantity N of candidate points, for example, acquiring the point cloud precision, and determining a multiple or power of the point cloud precision as the quantity N of candidate points.

Manner 2: When or in response to a determination that the space parameter of the point cloud includes the point cloud density, S630 includes: determining the preset distance d according to an association relationship between the point cloud density and the preset distance d, for example, acquiring the point cloud density, and determining a multiple of the point cloud density as the preset distance d.

Manner 3: When or in response to a determination that the space parameter of the point cloud includes the point cloud precision, S630 includes: determining the quantity K of neighbor points according to an association relationship between the point cloud precision and the quantity K of neighbor points, for example, acquiring the point cloud precision, and determining a multiple of the point cloud precision as the quantity K of neighbor points.

Manner 4: When or in response to a determination that the space parameter of the point cloud includes the point cloud quantization step, S630 includes: determining the quantity N of candidate points according to an association relationship between the point cloud quantization step and the quantity N of candidate points, for example, acquiring the point cloud quantization step, and determining a multiple of the point cloud quantization step as the quantity N of candidate points.

The association relationship in Manners 1 to 4 may be one of a preset function relationship, a preset operation relationship, and a preset mapping relationship, or any combination thereof, which is not limited in this embodiment of the present disclosure.

In implementation 2, when implementing the manners, the encoder side may acquire geometry information of points in the point cloud; determine the space parameter of the point cloud according to the geometry information of the points in the point cloud, where the space parameter of the point cloud includes at least one of the point cloud precision, the point cloud density, and the point cloud quantization step.

In some embodiments, the encoder side may alternatively carry the determined space parameter of the point cloud in the point cloud code stream, so that the decoder side may parse the space parameter of the point cloud from the point cloud code stream.

S640: Select at least one neighbor point of the current point from the encoded points according to the neighbor point parameters.

In some embodiments, S640 includes

S640-A1: Select N candidate points of the current point from the encoded points in the point cloud.

S640-A2: Select the at least one neighbor point of the current point from the N candidate points according to at least one of the quantity K of neighbor points and the preset distance d.

In some embodiments, S640-A2 includes: selecting, from the N candidate points, at least one candidate point meeting a target condition as the at least one neighbor point of the current point, the target condition including at least one of the following conditions:

condition 1: candidate points with a distance to the current point in each dimension less than a first preset distance;

condition 2: candidate points with a distance to the current point in each dimension equal to a second preset distance;

condition 3: K candidate points closest to the current point; and condition 4: the first K candidate points in the N candidate points obtained through sorting in a preset order being determined as neighbor points of the current point.

S650: Determine a predicted value of attribute information of the current point according to attribute information of the at least one neighbor point of the current point.

In some embodiments, S650 includes the following steps:

S650-A1: Determine an attribute weight of each of the at least one neighbor point of the current point.

S650-A2: Determine the predicted value of the attribute information of the current point according to the attribute information and the attribute weight of the at least one neighbor point of the current point.

In some embodiments, the implementations of S650-A1 include, but not limited to, the following:

In an implementation, the attribute weight of each of the at least one neighbor point of the current point is determined from at least one preset weight.

In some embodiments, when or in response to a determination that the at least one preset weight includes one preset weight, the determining the attribute weight of each of the at least one neighbor point of the current point from at least one preset weight includes: determining that the attribute weight of each of the at least one neighbor point is the preset weight.

In some embodiments, when or in response to a determination that the at least one preset weight includes a plurality of preset weights, the determining the attribute weight of each of the at least one neighbor point of the current point from at least one preset weight includes:

S650-A11: Determine, for each of the at least one neighbor point, a first distance between the neighbor point and the current point according to geometry information of the neighbor point and the current point.

S650-A12: Determine the attribute weight of the neighbor point from the plurality of preset weights according to the first distance between the neighbor point and the current point.

In some embodiments, the implementations of S650-A12 include, but not limited to, the following:

Manner 1: When or in response to a determination that the first distance is greater than or equal to a first preset weight in the plurality of preset weights and the first distance is less than a second preset weight in the plurality of preset weights, it is determined that the attribute weight of the neighbor point is the first preset weight, the second preset weight being a preset weight with the smallest difference from the first preset weight in the plurality of preset weights.

In certain embodiment(s), a weight interval between the first preset weight and the second preset weight is equal to a preset interval.

Manner 2: It is determined that the attribute weight of the neighbor point is a third preset weight in the plurality of preset weights when or in response to a determination that the first distance is less than or equal to a first threshold, and it is determined that the attribute weight of the neighbor point is a fourth preset weight in the plurality of preset weights when or in response to a determination that the first distance is greater than the first threshold, the third preset weight being less than the fourth preset weight.

In certain embodiment(s), the first threshold is a median value of the first distances between all of the at least one neighbor point of the current point and the current point. Alternatively, the first threshold is a multiple of the point cloud precision.

Manner 3: When or in response to a determination that a quantity of the plurality of preset weights is the same as that of the at least one neighbor point, the at least one neighbor point is sorted according to magnitudes of the first distances between the current point and the at least one neighbor point, the plurality of preset weights are sorted according to magnitudes of the plurality of preset weights, and the sorted preset weights are determined as the attribute weights of the sorted at least one neighbor point in a one-to-one correspondence manner.

Manner 4: For each of the at least one neighbor point when or in response to a determination that a quantity of the plurality of preset weights is different from that of the at least one neighbor point, a preset weight in the plurality of preset weights that is closest to a reciprocal of the first distance corresponding to the neighbor point is determined as the attribute weight of the neighbor point.

For the specific implementation processes of S610 and S650, reference may be made to the detailed description of S410 and S450, Details are not described herein again.

It is to be understood that the point cloud attribute prediction method in the encoder side is an inverse process of the point cloud attribute prediction method in the decoder side. For steps in the point cloud attribute prediction method in the encoder side, reference may be made to corresponding steps in the point cloud attribute prediction method in the decoder side. To avoid repetition, details are not described herein again.

The exemplary implementations of the present disclosure are described in detail with reference to the accompanying drawings. However, the present disclosure is not limited to the specific details in the implementations. In the scope of the technical idea of the present disclosure, various simple variants can be made on the technical solution of the present disclosure, and the simple variants all belong to the protection scope of the present disclosure. For example, the specific technical features described in the specific implementations may be combined in any suitable manner without contradiction. To avoid unnecessary repetition, various possible combinations are not further described in the present disclosure. In another example, the various implementations of the present disclosure may be combined without departing from the idea of the present disclosure, and such combinations shall also fall within the scope of the present disclosure.

It is to be further understood that sequence numbers of the processes do not mean execution sequences in various method embodiments of the present disclosure. The execution sequences of the processes shall be determined according to functions and internal logic of the processes, and shall not be construed as any limitation on the implementation processes of the embodiments of the present disclosure.

The method embodiments of the present disclosure are described in details with reference to FIG. 4 to FIG. 6, and the apparatus embodiments of the present disclosure are described below in details with reference to FIG. 7 and FIG. 9.

Figure 7:
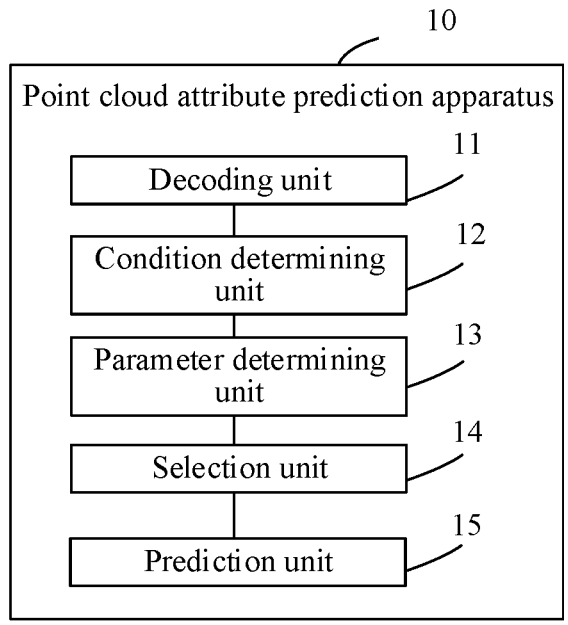
FIG. 7 is a schematic block diagram of a point cloud attribute prediction apparatus according to certain embodiment(s) of the present disclosure.

FIG. 7 is a schematic block diagram of a point cloud attribute prediction apparatus according to an embodiment of the present disclosure. The apparatus 10 may be a decoding device, or may be a part in a decoding device.

As shown in FIG. 7, the point cloud attribute prediction apparatus 10 may include: a decoding unit 11, configured to decode a point cloud code stream to obtain decoded points in a point cloud; a condition determining unit 12, configured to determine a target association relationship, the target association relationship including at least one association relationship of a preset association relationship between neighbor point parameters and a preset association relationship between a space parameter of the point cloud and the neighbor point parameters; a parameter determining unit 13, configured to obtain the neighbor point parameters according to the target association relationship, the neighbor point parameters including at least one of a quantity N of candidate points of a current point, a quantity K of neighbor points, and a preset distance d between the neighbor point and the current point, both N and K being positive integers, and d being a positive number; a selection unit 14, configured to select at least one neighbor point of the current point from the decoded points according to the neighbor point parameters; and a prediction unit 15, configured to determine a predicted value of attribute information of the current point according to attribute information of the at least one neighbor point of the current point.

In some embodiments, the association relationship between the neighbor point parameters includes an association relationship between a reference parameter and a non-reference parameter in the neighbor point parameters.

In some embodiments, when or in response to a determination that the target association relationship includes the association relationship between the reference parameter and the non-reference parameter in the neighbor point parameters, the parameter determining unit 13 is configured to: determine the reference parameter in the neighbor point parameters; and determine the non-reference parameter in the neighbor point parameters according to the reference parameter in the neighbor point parameters and the association relationship between the reference parameter and the non-reference parameter in the neighbor point parameters.

In some embodiments, the parameter determining unit 13 is configured to: determine, when or in response to a determination that the reference parameter in the neighbor point parameters includes a first reference parameter, a first non-reference parameter and a second non-reference parameter according to the first reference parameter, an association relationship between the first reference parameter and the first non-reference parameter in the neighbor point parameters, and an association relationship between the first reference parameter and the second non-reference parameter in the neighbor point parameters, the first reference parameter being any one of the quantity N of candidate points, the quantity K of neighbor points, and the preset distance d between the neighbor point and the current point, and the first non-reference parameter and the second non-reference parameter being parameters in the neighbor point parameters other than the first reference parameter; or determine, when or in response to a determination that the reference parameter in the neighbor point parameters includes a first reference parameter and a second reference parameter, a third non-reference parameter according to an association relationship between the first reference parameter and the third non-reference parameter in the neighbor point parameters or an association relationship between the second reference parameter and the third non-reference parameter in the neighbor point parameters, the third non-reference parameter being any one of the quantity N of candidate points, the quantity K of neighbor points, and the preset distance d between the neighbor point and the current point, and the first reference parameter and the second reference parameter being parameters in the neighbor point parameters other than the third non-reference parameter.

In some embodiments, the decoding unit 11 is further configured to decode the point cloud code stream to obtain the reference parameter in the neighbor point parameters.

In certain embodiment(s), the space parameter of the point cloud includes at least one of point cloud precision, point cloud density, and a point cloud quantization step.

In some embodiments, when or in response to a determination that the target association relationship includes the association relationship between the space parameter of the point cloud and the neighbor point parameters, the parameter determining unit 13 is configured to: determine the quantity N of candidate points according to an association relationship between the point cloud precision and the quantity N of candidate points; or determine the quantity N of candidate points according to an association relationship between the point cloud quantization step and the quantity N of candidate points; or determine the preset distance d according to an association relationship between the point cloud density and the preset distance d; or determine the quantity K of neighbor points according to an association relationship between the point cloud precision and the quantity K of neighbor points.

In some embodiments, the decoding unit 11 is further configured to: parse the point cloud code stream to obtain the space parameter of the point cloud; or parse the point cloud code stream to obtain geometry information of points in the point cloud, and determine the space parameter of the point cloud according to the geometry information of the points in the point cloud.

In some embodiments, the prediction unit 15 is configured to: determine an attribute weight of each of the at least one neighbor point of the current point; and determine the predicted value of the attribute information of the current point according to the attribute information and the attribute weight of the at least one neighbor point of the current point.

In some embodiments, the prediction unit 15 is configured to determine the attribute weight of each of the at least one neighbor point of the current point from at least one preset weight.

In some embodiments, the prediction unit 15 is configured to: determine, when or in response to a determination that the at least one preset weight includes one preset weight, that the attribute weight of each of the at least one neighbor point is the preset weight; or determine, for each of the at least one neighbor point when or in response to a determination that the at least one preset weight includes a plurality of preset weights, a first distance between the neighbor point and the current point according to geometry information of the neighbor point and geometry information of the current point, and determine the attribute weight of the neighbor point from the plurality of preset weights according to the first distance between the neighbor point and the current point.

In some embodiments, the prediction unit 15 is configured to: determine, when or in response to a determination that the first distance is greater than or equal to a first preset weight in the plurality of preset weights and the first distance is less than a second preset weight in the plurality of preset weights, that the attribute weight of the neighbor point is the first preset weight, the second preset weight being a preset weight with the smallest difference from the first preset weight in the plurality of preset weights; or determine that the attribute weight of the neighbor point is a third preset weight in the plurality of preset weights when or in response to a determination that the first distance is less than or equal to a first threshold, and determine that the attribute weight of the neighbor point is a fourth preset weight in the plurality of preset weights when or in response to a determination that the first distance is greater than the first threshold, the third preset weight being less than the fourth preset weight; or sort, when or in response to a determination that a quantity of the plurality of preset weights is the same as that of the at least one neighbor point, the at least one neighbor point according to magnitudes of the first distances between the current point and the at least one neighbor point, sort the plurality of preset weights according to magnitudes of the plurality of preset weights, and determine the sorted preset weights as the attribute weights of the sorted at least one neighbor point in a one-to-one correspondence manner; or determine, for each of the at least one neighbor point when or in response to a determination that a quantity of the plurality of preset weights is different from that of the at least one neighbor point, a preset weight in the plurality of preset weights that is closest to a reciprocal of the first distance corresponding to the neighbor point as the attribute weight of the neighbor point.

In certain embodiment(s), a weight interval between the first preset weight and the second preset weight is equal to a preset interval.

In certain embodiment(s), the first threshold is a median value of the first distances between all of the at least one neighbor point and the current point; or the first threshold is a multiple of the point cloud precision.

In some embodiments, the selection unit 14 is configured to: select N candidate points of the current point from the decoded points in the point cloud; and select the at least one neighbor point of the current point from the N candidate points according to at least one of the quantity K of neighbor points and the preset distance d.

In some embodiments, the selection unit 14 is configured to select, from the N candidate points, at least one candidate point meeting a target condition as the at least one neighbor point of the current point, the target condition including at least one of the following conditions:

condition 1: a distance to the current point in each dimension being less than a first preset distance;

condition 2: a distance to the current point in each dimension being equal to a second preset distance;

condition 3: K candidate points closest to the current point; and condition 4: the first K candidate points in the N candidate points obtained through sorting in a preset order.

In some embodiments, the decoding unit 11 is further configured to decode the point cloud code stream to obtain the target association relationship.

It is to be understood that the apparatus embodiments and the method embodiments may correspond to each other, and for similar descriptions, reference may be made to the method embodiments. To avoid repetition, details are not described herein again. In certain embodiment(s), the apparatus shown in FIG. 7 can perform the method embodiment shown in FIG. 4, and the other operations and/or functions of modules in the apparatus are respectively for implementing the method embodiments corresponding to the decoder. For brevity, details are not described herein again.

Figure 8:
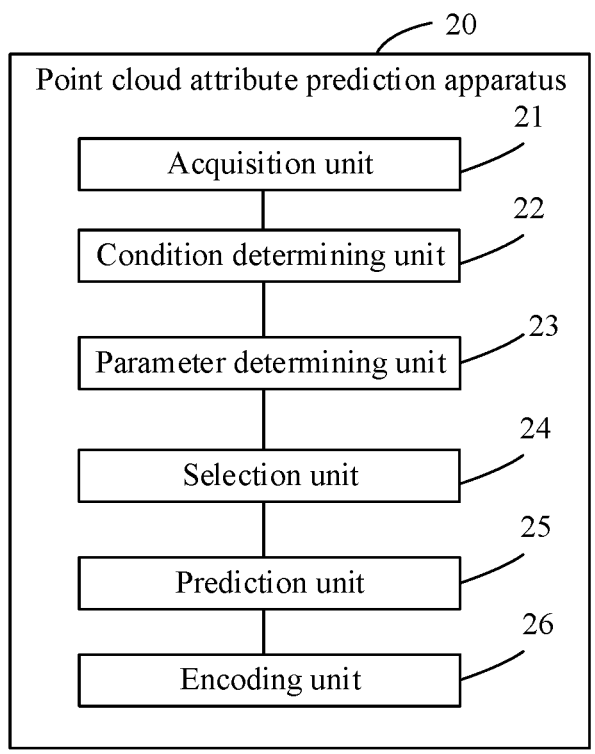
FIG. 8 is a schematic block diagram of a point cloud attribute prediction apparatus according to certain embodiment(s) of the present disclosure.

FIG. 8 is a schematic block diagram of a point cloud attribute prediction apparatus according to an embodiment of the present disclosure. The apparatus 20 may be an encoding device, or may be a part in an encoding device.

As shown in FIG. 8, the point cloud attribute prediction apparatus 20 may include: an acquisition unit 21, configured to acquire encoded points in a point cloud; a condition determining unit 22, configured to determine a target association relationship, the target association relationship including at least one association relationship of a preset association relationship between neighbor point parameters and a preset association relationship between a space parameter of the point cloud and the neighbor point parameters; a parameter determining unit 23, configured to obtain the neighbor point parameters according to the target association relationship, the neighbor point parameters including at least one of a quantity N of candidate points of a current point, a quantity K of neighbor points, and a preset distance d between the neighbor point and the current point, both N and K being positive integers, and d being a positive number; a selection unit 24, configured to select at least one neighbor point of the current point from the encoded points according to the neighbor point parameters; and a prediction unit 25, configured to determine a predicted value of attribute information of the current point according to attribute information of the at least one neighbor point of the current point.

In some embodiments, the association relationship between the neighbor point parameters includes an association relationship between a reference parameter and a non-reference parameter in the neighbor point parameters.

In some embodiments, when or in response to a determination that the target association relationship includes the association relationship between the reference parameter and the non-reference parameter in the neighbor point parameters, the parameter determining unit 23 is configured to: determine the reference parameter in the neighbor point parameters; and determine the non-reference parameter in the neighbor point parameters according to the reference parameter in the neighbor point parameters and the association relationship between the reference parameter and the non-reference parameter in the neighbor point parameters.

In some embodiments, the parameter determining unit 23 is configured to: determine, when or in response to a determination that the reference parameter in the neighbor point parameters includes a first reference parameter, a first non-reference parameter and a second non-reference parameter according to the first reference parameter, an association relationship between the first reference parameter and the first non-reference parameter in the neighbor point parameters, and an association relationship between the first reference parameter and the second non-reference parameter in the neighbor point parameters, the first reference parameter being any one of the quantity N of candidate points, the quantity K of neighbor points, and the preset distance d, and the first non-reference parameter and the second non-reference parameter being parameters in the neighbor point parameters other than the first reference parameter; or determine, when or in response to a determination that the reference parameter in the neighbor point parameters includes a first reference parameter and a second reference parameter, a third non-reference parameter according to an association relationship between the first reference parameter and the third non-reference parameter in the neighbor point parameters or an association relationship between the second reference parameter and the third non-reference parameter in the neighbor point parameters, the third non-reference parameter being any one of the quantity N of candidate points, the quantity K of neighbor points, and the preset distance d, and the first reference parameter and the second reference parameter being parameters in the neighbor point parameters other than the third non-reference parameter.

In some embodiments, the apparatus further includes an encoding unit 26, where the encoding unit 26 is configured to carry the reference parameter in the neighbor point parameters in the point cloud code stream.

In certain embodiment(s), the space parameter of the point cloud includes at least one of point cloud precision, point cloud density, and a point cloud quantization step.

In some embodiments, when or in response to a determination that the target association relationship includes the association relationship between the space parameter of the point cloud and the neighbor point parameters, the parameter determining unit 23 is configured to: determine the quantity N of candidate points according to an association relationship between the point cloud precision and the quantity N of candidate points; or determine the quantity N of candidate points according to an association relationship between the point cloud quantization step and the quantity N of candidate points; or determine the preset distance d according to an association relationship between the point cloud density and the preset distance d; or determine the quantity K of neighbor points according to an association relationship between the point cloud precision and the quantity K of neighbor points.

In some embodiments, the acquisition unit 21 is further configured to: acquire geometry information of points in the point cloud; and determine the space parameter of the point cloud according to the geometry information of the points in the point cloud, the space parameter of the point cloud including at least one of the point cloud precision and the point cloud density.

In some embodiments, the encoding unit 26 is further configured to carry the space parameter of the point cloud in the point cloud code stream.

In some embodiments, the prediction unit 25 is configured to: determine an attribute weight of each of the at least one neighbor point of the current point; and determine the predicted value of the attribute information of the current point according to the attribute information and the attribute weight of the at least one neighbor point of the current point.

In some embodiments, the prediction unit 25 is configured to determine the attribute weight of each of the at least one neighbor point of the current point from at least one preset weight.

In some embodiments, the prediction unit 25 is configured to: determine, when or in response to a determination that the at least one preset weight includes one preset weight, that the attribute weight of each of the at least one neighbor point is the preset weight; or determine, for each of the at least one neighbor point when or in response to a determination that the at least one preset weight includes a plurality of preset weights, a first distance between the neighbor point and the current point according to geometry information of the neighbor point and geometry information of the current point, and determine the attribute weight of the neighbor point from the plurality of preset weights according to the first distance between the neighbor point and the current point.

In some embodiments, the prediction unit 25 is configured to: determine, when or in response to a determination that the first distance is greater than or equal to a first preset weight in the plurality of preset weights and the first distance is less than a second preset weight in the plurality of preset weights, that the attribute weight of the neighbor point is the first preset weight, the second preset weight being a preset weight with the smallest difference from the first preset weight in the plurality of preset weights; or determine that the attribute weight of the neighbor point is a third preset weight in the plurality of preset weights when or in response to a determination that the first distance is less than or equal to a first threshold, and determine that the attribute weight of the neighbor point is a fourth preset weight in the plurality of preset weights when or in response to a determination that the first distance is greater than the first threshold, the third preset weight being less than the fourth preset weight; or sort, when or in response to a determination that a quantity of the plurality of preset weights is the same as that of the at least one neighbor point, the at least one neighbor point according to magnitudes of the first distances between the current point and the at least one neighbor point, sort the plurality of preset weights according to magnitudes of the plurality of preset weights, and determine the sorted preset weights as the attribute weights of the sorted at least one neighbor point in a one-to-one correspondence manner; or determine, for each of the at least one neighbor point when or in response to a determination that a quantity of the plurality of preset weights is different from that of the at least one neighbor point, a preset weight in the plurality of preset weights that is closest to a reciprocal of the first distance corresponding to the neighbor point as the attribute weight of the neighbor point.

In certain embodiment(s), a weight interval between the first preset weight and the second preset weight is equal to a preset interval.

In certain embodiment(s), the first threshold is a median value of the first distances between all of the at least one neighbor point and the current point; or the first threshold is a multiple of the point cloud precision.

In some embodiments, the selection unit 24 is configured to: select N candidate points of the current point from the encoded points in the point cloud; and select the at least one neighbor point of the current point from the N candidate points according to at least one of the quantity K of neighbor points and the preset distance d.

In some embodiments, the selection unit 24 is configured to select, from the N candidate points, at least one candidate point meeting a target condition as the at least one neighbor point of the current point, the target condition including at least one of the following conditions:

condition 1: a distance to the current point in each dimension being less than a first preset distance;

condition 2: a distance to the current point in each dimension being equal to a second preset distance;

condition 3: K candidate points closest to the current point; and condition 4: the first K candidate points in the N candidate points obtained through sorting in a preset order being determined as neighbor points of the current point.

In some embodiments, the encoding unit 26 is further configured to carry target association relationship in the point cloud code stream.

It is to be understood that the apparatus embodiments and the method embodiments may correspond to each other, and for similar descriptions, reference may be made to the method embodiments. To avoid repetition, details are not described herein again. In certain embodiment(s), the apparatus shown in FIG. 8 can perform the method embodiment shown in FIG. 6, and the other operations and/or functions of modules in the apparatus are respectively for implementing the method embodiments corresponding to the encoder. For brevity, details are not described herein again.

The apparatus in this embodiment of the present disclosure is described from the perspective of functional modules with reference to the accompanying drawings. It is to be understood that the functional modules may be implemented in the form of hardware, may be implemented by instructions in the form of software, or may be implemented by a combination of software and hardware. In certain embodiment(s), the steps of the method embodiments in the embodiments of the present disclosure may be performed by a hardware integrated logical circuit in a processor, or by using instructions in a form of software. The steps of the methods disclosed with reference to the embodiments of the present disclosure may be directly performed by using a hardware decoding processor, or may be performed by using a combination of hardware and software modules in the decoding processor. In certain embodiment(s), the software modules may be located in a mature storage medium in the field, such as a random access memory, a flash memory, a read-only memory, a programmable read-only memory, an electrically-erasable programmable memory, or a register. The storage medium is located in the memory. The processor reads information in the memory and completes the steps of the method embodiments in combination with hardware thereof.

Figure 9:
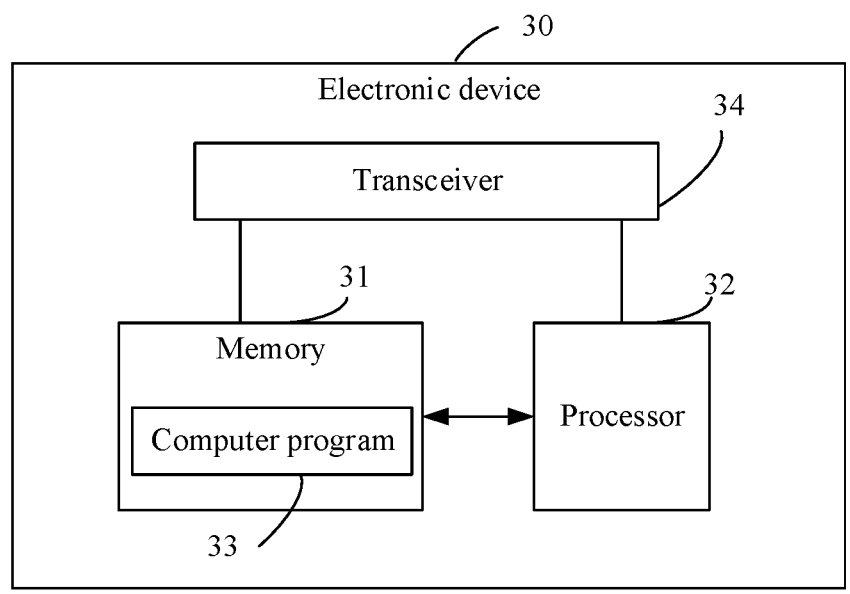
FIG. 9 is a schematic block diagram of an electronic device according to certain embodiment(s) of the present disclosure.

FIG. 9 is a schematic block diagram of a computing device according to an embodiment of the present disclosure. The computing device in FIG. 9 may be the point cloud encoder or point cloud decoder.

As shown in FIG. 9, the computing device 30 may include: a memory 31 and a processor 32, the memory 31 being configured to store a computer program 33, and transmit the computer program 33 to the processor 32. In other words, the processor 32 may invoke the computer program 33 from the memory 31 and run the computer program, to implement the method in the embodiments of the present disclosure.

For example, the processor 32 may be configured to perform the steps in the method 200 according to instructions in the computer program 33.

In some embodiments of the present disclosure, the processor 32 may include, but not limited to: a general purpose processor, a digital signal processor (DSP), an application-specific integrated circuit (ASIC), a field-programmable gate array (FPGA) or another programmable logic device, a discrete gate or a transistor logic device, or a discrete hardware component.

In some embodiments of the present disclosure, the memory 31 includes, but not limited to: a volatile memory and/or a non-volatile memory. The non-volatile memory may be a read-only memory (ROM), a programmable ROM (PROM), an erasable programmable read-only memory (EPROM), an electrically EPROM (EEPROM), or a flash memory. The volatile memory may be a random access memory (RAM), and is used as an external cache. Through exemplary but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM) and a direct rambus random access memory (DR RAM).

In some embodiments of the present disclosure, the computer program 33 may be divided into one or more modules, and the one or more modules are stored in the memory 31 and executed by the processor 32 to implement the point cloud attribute prediction method provided in the present disclosure. The one or more modules may be a series of computer program instruction segments capable of implementing specific functions, and the instruction segments are used for describing the execution process of the computer program 33 in the electronic device 30.

As shown in FIG. 9, the computing device 30 may further include: a transceiver 34. The transceiver 34 may be connected to the processor 32 or the memory 31.

The processor 32 may control the transceiver 34 to communicate with another device and may send information or data to another device or receive information or data sent by another device. The transceiver 34 may include a transmitter and a receiver. The transceiver 34 may further include an antenna, and a quantity of the antenna can be one or more.

It is to be understood that components in the computing device 30 are connected by a bus system. In addition to a data bus, the bus system may further include a power bus, a control bus, and a status signal bus.

According to an aspect of the present disclosure, a computer storage medium is provided, storing a computer program, the computer program, when executed by a computer, causing the computer to be capable of performing the method in the method embodiments. Alternatively, an embodiment of the present disclosure further provides a computer program product including instructions, the instructions, when executed by a computer, causing the computer to perform the method in the method embodiments.

According to another aspect of the present disclosure, a computer program product or a computer program is provided, the computer program product or the computer program including computer instructions, the computer instructions being stored in a computer-readable storage medium. A processor of a computing device reads the computer instructions from the computer-readable storage medium and executes the computer instructions to cause the computing device to perform the method in the method embodiments.

In the several embodiments provided in the present disclosure, it is to be understood that the disclosed system, apparatus, and method may be implemented in other manners. For example, the described apparatus embodiments are merely examples. For example, division of the modules is merely logical function division and may be other division manners during actual implementation. For example, a plurality of modules or components may be combined or integrated into another system, or some features may be ignored or not performed. In addition, the displayed or discussed mutual couplings or direct couplings or communication connections may be implemented by using some interfaces. The indirect couplings or communication connections between the apparatuses or modules may be implemented in electronic, mechanical, or other forms.

The modules described as separate components may or may not be physically separated, and the components displayed as modules may or may not be physical modules, i.e., may be located in one place or may be distributed over a plurality of network units. Some or all of the modules may be selected to implement the objectives of the solutions of the embodiments. For example, functional modules in the embodiments of the present disclosure may be integrated into one processing module, or each of the modules may exist alone physically, or two or more modules may be integrated into one module.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

The descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A point cloud attribute prediction method, performed by a computing device, the method comprising:
    decoding a point cloud code stream to obtain decoded points in a point cloud;
    determining a target association relationship, the target association relationship including an association relationship between neighbor point parameters;
    obtaining the neighbor point parameters according to the target association relationship, the neighbor point parameters including at least one of a quantity N of candidate points of a current point, a quantity K of neighbor points, and a preset distance d between the neighbor point and the current point, both N and K being positive integers, and d being a positive number;
    selecting at least one neighbor point of the current point from the decoded points according to the neighbor point parameters; and
    determining a predicted value of attribute information of the current point according to attribute information of the at least one neighbor point of the current point,
    wherein:
    the association relationship between the neighbor point parameters includes a mathematical operation relationship between a reference parameter and a non-reference parameter in the neighbor point parameters, the reference parameter being one of the quantity N of candidate points, the quantity K of neighbor points, and the preset distance d, and the non-reference parameter being a parameter in the neighbor point parameters other than the reference parameter.

2. The method according to claim 1, wherein a value of the reference parameter being preset or being decoded from the point cloud code stream.

3. The method according to claim 1, wherein in response to a determination that the target association relationship includes the association relationship between the reference parameter and the non-reference parameter in the neighbor point parameters, obtaining the neighbor point parameters comprises:
 determining the reference parameter in the neighbor point parameters; and
 determining the non-reference parameter in the neighbor point parameters according to the reference parameter in the neighbor point parameters and the association relationship between the reference parameter and the non-reference parameter in the neighbor point parameters.

4. The method according to claim 3, wherein determining the non-reference parameter comprises:
 determining, in response to a determination that the reference parameter in the neighbor point parameters includes a first reference parameter, a first non-reference parameter and a second non-reference parameter according to the first reference parameter, an association relationship between the first reference parameter and the first non-reference parameter in the neighbor point parameters, and an association relationship between the first reference parameter and the second non-reference parameter in the neighbor point parameters, and the first non-reference parameter and the second non-reference parameter being parameters in the neighbor point parameters other than the first reference parameter; or
 determining, in response to a determination that the reference parameter in the neighbor point parameters includes a first reference parameter and a second reference parameter, a third non-reference parameter according to an association relationship between the first reference parameter and the third non-reference parameter in the neighbor point parameters or an association relationship between the second reference parameter and the third non-reference parameter in the neighbor point parameters, the third non-reference parameter being one of the quantity N of candidate points, the quantity K of neighbor points, and the preset distance d, and the first reference parameter and the second reference parameter being parameters in the neighbor point parameters other than the third non-reference parameter.

5. The method according to claim 1, wherein:
 the target association relationship further includes an association relationship between a space parameter of the point cloud and at least one of the neighbor point parameters; and
 the space parameter of the point cloud includes at least one of: point cloud precision, point cloud density, or a point cloud quantization step.

6. The method according to claim 5, further comprising:
 parsing the point cloud code stream to obtain the space parameter of the point cloud; or
 parsing the point cloud code stream to obtain geometry information of points in the point cloud, and determining the space parameter of the point cloud according to the geometry information of the points in the point cloud.

7. The method according to claim 1, wherein determining the predicted value of attribute information of the current point comprises:
 determining an attribute weight of each of the at least one neighbor point of the current point; and
 determining the predicted value of the attribute information of the current point according to the attribute information and the attribute weight of the at least one neighbor point of the current point.

8. The method according to claim 7, wherein determining the attribute weight comprises:
 determining the attribute weight of each of the at least one neighbor point of the current point from at least one preset weight.

9. The method according to claim 8, wherein determining the attribute weight comprises:
 determining, in response to a determination that the at least one preset weight includes one preset weight, that the attribute weight of each of the at least one neighbor point is the preset weight; or
 determining, for each of the at least one neighbor point in response to a determination that the at least one preset weight includes a plurality of preset weights, a first distance between the neighbor point and the current point according to geometry information of the neighbor point and geometry information of the current point, and determining the attribute weight of the neighbor point from the plurality of preset weights according to the first distance between the neighbor point and the current point.

10. The method according to claim 9, wherein determining the attribute weight of the neighbor point comprises:
 determining, in response to a determination that the first distance is greater than or equal to a first preset weight in the plurality of preset weights and the first distance is less than a second preset weight in the plurality of preset weights, that the attribute weight of the neighbor point is the first preset weight, the second preset weight being a preset weight with the smallest difference from the first preset weight in the plurality of preset weights; or
 determining that the attribute weight of the neighbor point is a third preset weight in the plurality of preset weights in response to a determination that the first distance is less than or equal to a first threshold, and determining that the attribute weight of the neighbor point is a fourth preset weight in the plurality of preset weights in response to a determination that the first distance is greater than the first threshold, the third preset weight being less than the fourth preset weight; or
 sorting, in response to a determination that a quantity of the plurality of preset weights is the same as that of the at least one neighbor point, the at least one neighbor point according to magnitudes of the first distances between the current point and the at least one neighbor point, sorting the plurality of preset weights according to magnitudes of the plurality of preset weights, and determining the sorted preset weights as the attribute weights of the sorted at least one neighbor point in a one-to-one correspondence manner; or
 determining, for each of the at least one neighbor point in response to a determination that a quantity of the plurality of preset weights is different from that of the at least one neighbor point, a preset weight in the plurality of preset weights that is closest to a reciprocal of the first distance corresponding to the neighbor point as the attribute weight of the neighbor point.

11. The method according to claim 10, wherein the first threshold is a median value of the first distances between all of the at least one neighbor point and the current point; or the first threshold is a multiple of the point cloud precision.

12. The method according to claim 1, wherein selecting the at least one neighbor point of the current point comprises:

selecting N candidate points of the current point from the decoded points in the point cloud; and selecting the at least one neighbor point of the current point from the N candidate points according to at least one of the quantity K of neighbor points and the preset distance d.

13. The method according to claim 12, wherein selecting the at least one neighbor point of the current point comprises:

selecting, from the N candidate points, at least one candidate point meeting a target condition as the at least one neighbor point of the current point, the target condition including one or more of:

condition 1: a distance to the current point in each dimension being less than a first preset distance;

condition 2: a distance to the current point in each dimension being equal to a second preset distance;

condition 3: K candidate points closest to the current point; and condition 4: the first K candidate points in the N candidate points obtained through sorting in a preset order.

14. A point cloud attribute prediction apparatus, comprising: a memory storing computer program instructions; and a processor coupled to the memory and configured to execute the computer program instructions and perform:

decoding a point cloud code stream to obtain decoded points in a point cloud;

determining a target association relationship, the target association relationship including an association relationship between neighbor point parameters;

obtaining the neighbor point parameters according to the target association relationship, the neighbor point parameters including at least one of a quantity N of candidate points of a current point, a quantity K of neighbor points, and a preset distance d between the neighbor point and the current point, both N and K being positive integers, and d being a positive number;

selecting at least one neighbor point of the current point from the decoded points according to the neighbor point parameters; and determining a predicted value of attribute information of the current point according to attribute information of the at least one neighbor point of the current point, wherein:

the association relationship between the neighbor point parameters includes a mathematical operation relationship between a reference parameter and a non-reference parameter in the neighbor point parameters, the reference parameter being one of the quantity N of candidate points, the quantity K of neighbor points, and the preset distance d, and the non-reference parameter being a parameter in the neighbor point parameters other than the reference parameter.

15. The method according to claim 5, wherein in response to a determination that the target association relationship includes the association relationship between the space parameter of the point cloud and the neighbor point parameters, obtaining the neighbor point parameters comprises:

determining the quantity N of candidate points according to an association relationship between the point cloud precision and the quantity N of candidate points; or determining the quantity N of candidate points according to an association relationship between the point cloud quantization step and the quantity N of candidate points; or determining the preset distance d according to an association relationship between the point cloud density and the preset distance d; or determining the quantity K of neighbor points according to an association relationship between the point cloud precision and the quantity K of neighbor points.

16. A non-transitory computer-readable storage medium storing computer program instructions executable by at least one processor to perform:

decoding a point cloud code stream to obtain decoded points in a point cloud;

determining a target association relationship, the target association relationship including an association relationship between neighbor point parameters;

obtaining the neighbor point parameters according to the target association relationship, the neighbor point parameters including at least one of a quantity N of candidate points of a current point, a quantity K of neighbor points, and a preset distance d between the neighbor point and the current point, both N and K being positive integers, and d being a positive number;

selecting at least one neighbor point of the current point from the decoded points according to the neighbor point parameters; and determining a predicted value of attribute information of the current point according to attribute information of the at least one neighbor point of the current point, wherein:

the association relationship between the neighbor point parameters includes a mathematical operation relationship between a reference parameter and a non-reference parameter in the neighbor point parameters, the reference parameter being one of the quantity N of candidate points, the quantity K of neighbor points, and the preset distance d, and the non-reference parameter being a parameter in the neighbor point parameters other than the reference parameter.

17. The method according to claim 1, wherein:

the mathematical operation relationship between the reference parameter and the non-reference parameter in the neighbor point parameters comprises at least one of: an additive relationship, a subtraction relationship, a multiplication relationship, or a ratio relationship.

18. The method according to claim 1, wherein:

the mathematical operation relationship between the reference parameter and the non-reference parameter in the neighbor point parameters comprises that a result of a mathematical operation between the reference parameter and the non-reference parameter equals a preset value.

19. The method according to claim 5, wherein:

the association relationship between the space parameter of the point cloud and at least one of the neighbor point parameters is a mathematical operation relationship between the space parameter of the point cloud and at least one of the quantity N of candidate points, the quantity K of neighbor points, and the preset distance d.

20. The method according to claim 5, wherein:

the association relationship between the space parameter of the point cloud and at least one of the neighbor point parameters comprises that a result of a mathematical operation on the space parameter equals a value of one of the neighbor point parameters.

* * * * *